United States Patent
Benamira

(10) Patent No.: US 9,802,464 B2
(45) Date of Patent: Oct. 31, 2017

(54) AIR OUTLET WITH VORTEX FLOW AND DIRECTED FLOW

(75) Inventor: Salah Benamira, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 471 days.

(21) Appl. No.: 13/008,815

(22) Filed: Jan. 18, 2011

(65) Prior Publication Data

US 2011/0111685 A1 May 12, 2011

Related U.S. Application Data

(63) Continuation of application No. PCT/EP2009/005106, filed on Jul. 14, 2009.

(30) Foreign Application Priority Data

Jul. 16, 2008 (DE) .................. 10 2008 033 339

(51) Int. Cl.
*B60H 1/34* (2006.01)

(52) U.S. Cl.
CPC .......... *B60H 1/345* (2013.01); *B60H 1/3442* (2013.01); *B60H 1/3457* (2013.01)

(58) Field of Classification Search
CPC ....................................... B60H 1/34
USPC ........................................ 454/155
See application file for complete search history.

(56) References Cited

U.S. PATENT DOCUMENTS

| 2,078,185 | A | * | 4/1937 | Wiggins et al. | 160/102 |
| 2,100,801 | A | * | 11/1937 | Green | 454/10 |
| 4,915,021 | A | * | 4/1990 | Soethout | 454/155 |
| 4,979,429 | A | * | 12/1990 | Soethout et al. | 454/162 |
| 5,230,654 | A | * | 7/1993 | Bloomer | 454/155 |
| 6,787,782 | B1 | * | 9/2004 | Krosney et al. | 250/436 |
| 7,306,512 | B2 | * | 12/2007 | Sawai | 454/155 |
| 7,585,149 | B2 | * | 9/2009 | Skotrikov et al. | 415/126 |
| 8,038,516 | B2 | * | 10/2011 | Klingler et al. | 454/155 |
| 2004/0005853 | A1 | * | 1/2004 | Thomassin | B60H 1/3442 454/76 |
| 2005/0197056 | A1 | * | 9/2005 | Thomassin et al. | 454/71 |

(Continued)

FOREIGN PATENT DOCUMENTS

DE    37 36 448 A1    5/1989
DE    299 14 962 U1   11/1999
(Continued)

OTHER PUBLICATIONS

Japanese Office Action for Japanese Application No. 2011-517800 dated Apr. 16, 2013 with partial English Translation.

*Primary Examiner* — Steven B McAllister
*Assistant Examiner* — Samantha Miller
(74) *Attorney, Agent, or Firm* — Muncy, Geissler, Olds & Lowe, P.C.

(57) ABSTRACT

An air discharger for discharging an air stream, in particular in a vehicle interior, includes at least one air guide channel and at least one air routing element disposed therein. The routing element being designed as a vane wheel having at least one vane, wherein each of the vanes is formed from at least two segments disposed in succession axially. The segments being able to move at least relative to one another angularly between a position that brings about a "diffuse" mode and a position that brings about a "total air" mode by way of an axially adjustable variable flow cross section of the air guide channel.

22 Claims, 20 Drawing Sheets

(56) References Cited

U.S. PATENT DOCUMENTS

| | | | |
|---|---|---|---|
| 2006/0135054 A1* | 6/2006 | Burr et al. | 454/155 |
| 2007/0060035 A1* | 3/2007 | Burr et al. | 454/155 |
| 2007/0111652 A1* | 5/2007 | Klingler et al. | 454/155 |
| 2008/0171509 A1* | 7/2008 | Grossmann et al. | 454/155 |
| 2008/0233857 A1* | 9/2008 | Kuhnel | 454/152 |
| 2011/0039488 A1* | 2/2011 | Uhlenbusch | 454/155 |
| 2011/0105009 A1* | 5/2011 | Fritsche et al. | 454/162 |

FOREIGN PATENT DOCUMENTS

| | | |
|---|---|---|
| DE | 100 36 776 A2 | 2/2002 |
| DE | 10 2005 036 159 A1 | 7/2006 |
| DE | 10 2007 013 868 A1 | 9/2008 |
| EP | 0936 091 B1 | 8/1999 |
| EP | 1 800 918 A1 | 6/2007 |
| EP | 1 972 476 A1 | 9/2008 |
| FR | 2 835 219 A1 | 8/2003 |
| JP | 06-239133 A | 8/1994 |
| JP | 11-325570 A | 11/1999 |
| JP | 2002-327954 A | 11/2002 |
| WO | WO 2008/107070 A1 | 9/2008 |

\* cited by examiner

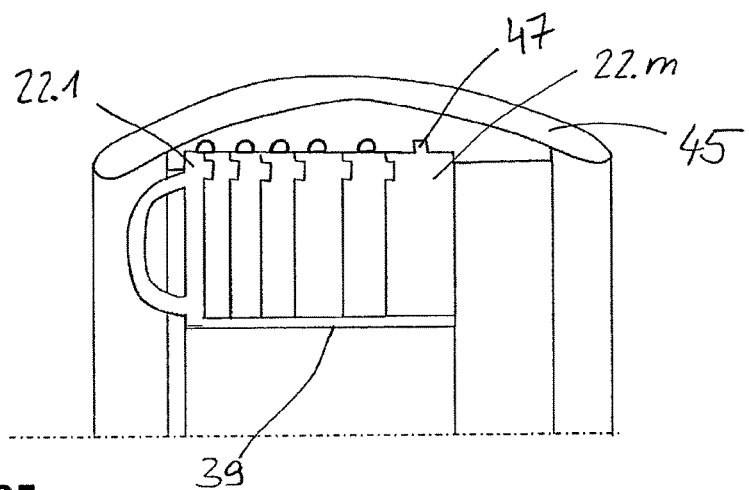
FIG. 25
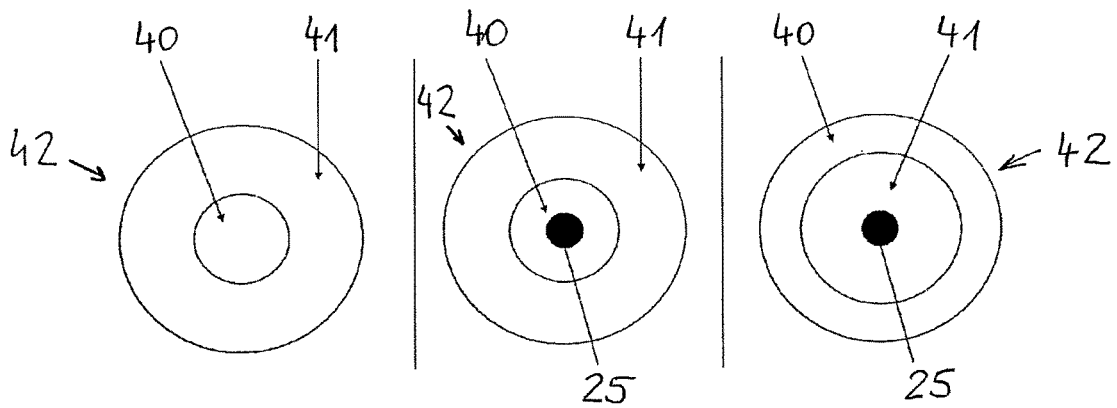
FIG. 26a   FIG. 26b   FIG. 26c

AIR OUTLET WITH VORTEX FLOW AND DIRECTED FLOW

This nonprovisional application is a continuation of International Application No. PCT/EP2009/005106, which was filed on Jul. 14, 2009, and which claims priority to German Patent Application No. DE 10 2008 033 339.5, which was filed in Germany on Jul. 16, 2008, and which are both herein incorporated by reference.

BACKGROUND OF THE INVENTION

Field of the Invention

The present invention relates to an air outlet, particularly for air conditioning a vehicle interior.

Description of the Background Art

Air outlets in various variants are known from the state of the art. They are used to rapidly create a pleasant climate within the vehicle interior. Their task is to convey air sufficient for this purpose into the interior.

DE 100 36 776 A1 describes a device for air-conditioning an interior, especially a vehicle air-conditioning unit, with an air-conditioner with a conditioned air guide and with an air heating device with a heated air guide. The conditioned air guide and the heated air guide are connected to the interior and merged via an orifice part in the form of a double nozzle, which has an inner tube and a concentric outer tube. In this regard, a vortex flow guide, which is preferably adjustable, can be provided in the annular space between the inner tube and the outer tube. This device concerns a two-channel air outlet with an inner air guide channel for a concentrated air jet (also called a spot region) and an outer air guide channel for a vortex flow (also called a diffuse region). In the completely opened position, the diffuse region has a high pressure drop and considerable noise generation. The efficiency of the spot region is reduced thereby.

German Utility Model No. DE 299 14 962 U1 describes a single-channel air outlet, particularly for vehicle ventilation, with a vortex generator, which has a plurality of guide vanes, each of which is pivotable around a swivel axis. The swivel axes are arranged somewhat radially around a mutual central axis, whereby a rotary movement of the central axis can be transmitted as a swivel movement to the swivel axes of the guide vanes. The swivel axes assigned to the guide vanes are each connected rotationally fixed to a friction or toothed wheel, which has a drive connection to a central friction or toothed wheel of the central axis. The central axis on its outflow-side axis end has a manually operable turning handle. In the case of this air outlet, because of the small depth and small deflection effect of the vortex generator, only a flow with a weak vortex can be generated.

An air outlet, in which a guide ramp with a spiral or helical shape is proposed, is disclosed in EP 0 936 091 B1. This causes a flow with a considerable vortex and thereby a greater distribution of the air stream guided in it in the form of a diffuse region. Adjustment of the air conditioning effect to the particular ambient conditions is not possible, however, by the constant vortex flow in the diffuse region of said air outlet.

Another air stream control unit is disclosed in DE 10 2005 036 159 A1, which has a plurality of movable air guide elements for generating a concentric air flow and at least one vortex-like jet expansion, whereby the at least one vortex-like air flow can be adjusted continuously.

SUMMARY OF THE INVENTION

It is therefore an object of the present invention to provide an air outlet, which has a simple structure and allows adjustment of an air-conditioning effect, whereby a broad range of variations in the adjustment is possible.

An object according to an embodiment of the invention is achieved by an air outlet for discharging an air stream, particularly into a vehicle interior, with at least one air guide channel and at least one air guide element disposed therein in the form of a vane wheel having at least one vane, whereby each vane is formed from at least two axially successively disposed segments, which can be moved angularly at least relative to one another between a position that brings about a "diffuse" mode and a position that brings about a "total air" mode with an axially variably adjustable flow cross section of the air guide channel. This type of axially variably adjustable flow cross section enables a multifunctional, particularly bifunctional nozzle with the "diffuse" mode with a diffuse flow or vortex flow and the "total air" mode with a largely conventional, particularly similarly directed flow (also called spot flow).

Preferably, 1 to 20, especially preferably 3 to 7, particularly 5 vanes are provided for the air guide element in the form of a vane wheel.

In an embodiment, the segments can be moved angularly at least relative to one another between the position that brings about the "diffuse" mode, in which they maximally reduce the flow cross section at a maximum swirling of the air stream and the position that brings about the "total air" mode, in which they reduce the flow cross section minimally with a minimal swirling of the air stream. In this case, the segments of the vanes in the position with the minimally reduced flow cross section are disposed in the axial direction of the air outlet largely identically one above another, so that a largely directed flow results on the flow exit side.

In the other position with the maximally reduced cross section, the segments of a vane in each case can be moved angularly to one another in such a way that a fan-shaped air guiding surface in the flow direction forms. The air flow is deflected and thereby swirled by means of the fan-shaped air guiding surface in the transverse direction to the longitudinal channel axis. As long as the swirled air flow flows through the air guide channel, the channel walls act against the centrifugal force of the swirled air flow. At the air outlet exit, the air flow splits in the radial direction and flows diffusely into the vehicle interior. Thus, a vortex or turbulence flow occurs on the flow exit side at the air outlet. The angularly moved segments of the vane can form alternatively also a wing-shaped or helix-shaped or spiral-shaped or coil-shaped air guiding surface. The segments of the particular vane, moreover, can be placed in any intermediate position between the aforementioned positions (also called end positions or stop positions). Preferably, the vane wheel is disposed just before the air outlet exit. Due to the vane wheel, the air flow is swirled only over a short path, as a result of which the air flow does not experience any great deflections previously and therefore has a lower pressure loss. The use of a larger cross section and the swirling of the air flow on shorter paths result in addition in smaller wetted surface areas and lower flow velocities. Lower pressure losses and a better acoustic behavior result in turn.

The segments can be mounted concentrically around the longitudinal axis of the air outlet. In particular, the segments can be centered around the perimeter of an inner channel or a closed cylinder. In this regard, the air guide element can be formed from a single helix-shaped vane, comprising a plurality of segments. Alternatively, the air guide element can be formed from a plurality of vanes disposed concentrically around the longitudinal axis of the air outlet and their fan-shaped or helix-shaped variably adjustable segments. In another alternative embodiment, a multiple helix can be formed by a plurality of vane wheels disposed successively in the longitudinal extension of the air outlet. In detail, to generate an adjustable vortex or diffuse flow, the air guide element, i.e., especially the vanes of the vane wheel(s), is moved accordingly, so that at least one helix is formed. Within the meaning of the invention, any continuing structure rotating into the depth of the space of the air outlet is a consideration as a helix for the vane wheel. This type of structure can be formed in particular fan-shaped, spiral-shaped, or as a helical coil.

It is possible to provide the air outlet with an angular staggering positioning device, which in at least one part of the positions of the air guide element brings about a defined angular staggering of the individual axially successively disposed segments. It is possible thereby in an especially simple manner to produce in all of the provided segments a defined angular rotary position to one another, or to produce a defined region of angular rotary positions to one another. Thus, it is possible, for example, that only one of the segments is driven by an external drive. The rest of the segments, in contrast, can be driven by the angular staggering positioning device. Furthermore, it is possible with the proposed structure that individual segments are in different positions to one another along a defined curve. This position of the segments relative to one another can be selected especially so that an effective vane area results, which results in a position especially suitable, for example, for the "total air" mode or the "diffuse" mode. It is also possible in particular that a vane area, which brings a lowest possible air resistance against the air flowing through the air outlet, results in the two mentioned end positions, optionally also in the intermediate positions. The angular staggering positioning device can be realized, for example, with the use of an elastic element, rigidly connected to the segments, or with the aid of an element provided with a guide groove. In particular, an embodiment in the form of one or a plurality of stop elements is possible, which permit a defined, allowable angle range.

It can be especially advantageous, when the individual axially successively disposed segments of at least one vane are disposed along a nonlinear curve, especially along an arcuately curved line, preferably a spline line. Specifically a nonlinear design of the vane can be especially advantageous for the "diffuse" mode (or for intermediate positions at which a partially "diffuse" air outflow occurs). For example, a "gentle" and continuously increasing deflection of the air flowing through the air guide element of the air outlet can be produced by such a nonlinear curve. As a result, an undesirable swirling effect can be largely reduced, so that the pressure drop in the flowing air can be reduced. In particular, the nonlinear curve can be selected as increasing progressively. Especially advantageous curve shapes can be an arcuately curved line (particularly an arc-shaped curved line) or a spline line.

Especially favorable flow relations can result, when the entrance angle of at least one vane is at least at times between 30° and 150°, preferably between 70° and 110°, especially preferably between 85° and 95°, and/or the exit angle of the air stream is at least at times between 0° and 90°, preferably between 10° and 70°, especially preferably between 20° and 40°. The angle data provided in each case refer to the angle between the local attack angle of the vane (vane center line, averaged vane center line, vane surface area, and/or averaged vane surface area) and a plane parallel to the segments (i.e., a plane which is normally in the unaffected air flow direction). Tests have shown that the aforementioned values produce an especially favorable flow behavior. The mentioned values apply especially to the "diffuse" mode, but optionally also to an intermediate position between the "diffuse" mode" and the "total air" mode.

It can also be advantageous, when the average stagger angle between two axially successively disposed segments is between 0° and 90°, preferably between 40° and 80°, and especially preferably between 50° and 70°. Here as well, the mentioned values apply especially to the position of the segments in the "diffuse" mode" and optionally also to intermediate positions between the "diffuse" mode" and the "total air" mode. With the mentioned values for the average stagger angle, a vane contour especially suitable for a diffuse air outflow (with respect to the vane center line, the averaged vane line, the vane surface area, and/or the averaged vane surface area), which results from the arrangement of the individual segments, can also be produced. An especially effective, diffuse air outlet with an especially low pressure drop during the flow of air therethrough can result thereby.

It can prove especially practical, when at least two, preferably all of the axially successively disposed segments have a different shape. The differences in shape in this regard can refer in particular to the surface shaping, the surface quality, different materials (particularly different surface coatings), different attack angles, different recesses, the provision of recesses and passages, and to the thickness of the corresponding segment. The different shape of the individual segments can be selected particularly so that an especially advantageous overall configuration of the resulting vane results. The configuration of this type of an especially advantageous overall configuration of at least one vane can refer to one of the two end positions (in the "diffuse" mode" or in the "total air" mode), to both end positions, but also to intermediate positions between these two end positions. In this regard, it is not absolutely necessary to achieve the particular optimum in precisely one of the possible positions (or in a limited number of possible positions). Rather, it can also be advantageous to allow a certain deviation from the optimum, particularly when in an especially large number of possible positions of the individual segments to one another, a surface form results thereby which comes relatively close to the optimum.

An especially advantageous configuration of the air outlet can result, when especially in the "diffuse" mode (optionally also in the "total air" mode" and/or in one or more intermediate positions, however) a substantially flush surface contouring of at least one vane results, which preferably runs approximately parallel to the curve of the segments of the corresponding vane. Undesirable swirling of the air in passing over the corresponding surface can be largely avoided with this type of "smooth" surface design. The pressure drop in particular along the air outlet can be reduced especially effectively thereby. Specifically in the "diffuse" position (or in a position with a partial "diffuse" portion), it is usually unavoidable to cause some pressure drop in the flowing air. In this respect, it can prove especially expedient, specifically in these positions in which an increased pressure drop occurs in any event, to reduce an additional increase in the pressure drop due to unnecessary swirling. If the surface contouring of the vane, moreover, runs approximately parallel to the curve of the segments of the corresponding vane, the vanes can be realized with largely minimal material costs. This can reduce the manufacturing costs in particular.

It can be especially expedient, when at least two segments, disposed axially adjacent in succession, overlap at least in areas when viewed in the axial direction. This type of configuration can effectively reduce the flow of air between the segments like a lamellar seal. As a result, the efficiency of the air outlet can be increased further. Such an overlapping of subregions of successively disposed segments can be realized, for example, by L-shaped recesses. In this case, a first L-shaped recess of a segment is disposed opposite to a second "inverted" L-shaped recess of the neighboring segment. The L-shaped recesses in this case can be dimensioned so that the long sides, facing each other, of the L-shaped recesses contact each other in the "direct air" mode. In other positions, on the contrary, a hollow space results, which is bounded by the surfaces of the L-shaped recesses. The hollow space in this case can occupy its maximum volume, when the air outlet is in its end position in the "diffuse" mode. The individual segments in this regard can rest so closely against each other that no air can substantially flow through the gaps. If the corresponding gaps are made especially tight, it may prove necessary to provide air supply channels, which lead to the inner hollow spaces with a variable volume. An aeration of an enlarged hollow space, or an exhausting of a reduced hollow space, can be realized in this way. Other types of configurations are of course conceivable, however.

It can be expedient, furthermore, to provide at least one additional air guide channel, which is operated at least predominantly, preferably substantially steadily in a "total air" mode. Tests with test subjects have shown that a large portion of subjects desire an (at least) partly sustained air inflow with a directed air jet (a so-called "spot" air inflow). By providing this type of sustained spot fraction, an outlet can be realized which can satisfy especially high comfort requirements. Of course, it is not ruled out that the spot portion can be closed off at least partly, for example, with the help of flap valves. It is essential in this regard that a directed air outflow ("spot" air outflow) can occur in addition (and not only alternatively) to the diffuse air outflow.

Particularly in this regard, it can prove expedient if at least one of the air guide channels is embodied as a ring-shaped air guide channel and/or as a circular air guide channel. For example, it is conceivable that a spot channel is provided with a circular cross section, which is surrounded by an annularly disposed region in which the previously described movable air guide element(s) is (are) arranged. In so doing, it is also possible that an actuating element for the air outlet is disposed in the center of the circular additional air guide channel (for example, centrally in the middle). In this case, virtually two ring-shaped air guide channels result, whereby the air guide channel with the air guide elements is disposed radially outward and the additional air guide channel for the spot ventilation radially in the middle. The radial arrangement, however, can also be the reverse, so that a radially outward ring for the spot ventilation results, in whose center a ring-shaped or circular air guide channel (with or without an actuating element) with air guide elements is disposed.

In an embodiment, the air guide channel can be configured as a circular channel or circular tube, which as an outer air guide channel surrounds another inner air guide channel and runs parallel to it. In this case, the two air guide channels are formed cylindrically and coaxially. In other words: an outer, ring-shaped air guide channel surrounds an inner cylindrical air guide channel. In this way, a two-channel air outlet with an outer air guide channel with a vane wheel with an adjustable fan shape or helix shape for the "diffuse" mode and "total air" mode and with an inner air guide channel for a "directed flow" mode can be realized. Thus, different types of ventilation, e.g., a spot ventilation and a diffuse ventilation, are enabled simultaneously. A higher ventilation efficiency can be achieved by the reduced pressure drop during diffuse ventilation. Moreover, a simple assembly and production are made possible by putting together shell-shaped, particularly half- or four-shelled components, e.g., half-shelled or four-shelled housing parts in which the ring-shaped disk elements can be arranged stackable one top of one another.

A possible expedient refinement can result when at least one segment has a sleeve-like extension, which acts as a bearing bushing for at least one part of the other segments. In this manner, a unit, which has the individual segments, can be made especially simply and with the saving of cost and space. Because the segments can usually be made from the same material, a uniform and low-friction mounting (particularly when a suitable material is selected for the segments) of the segments together can also be realized thereby. Flowing of air through the gap between two segments can be effectively prevented, moreover, in an especially simple and effective manner by the sleeve-like configuration of the bearing area.

It can also be expedient if at least one self-locking device for at least one segment is provided, which is formed particularly as a narrow fit, as frictional material, as an insertion device, and/or as roughening. A defined friction behavior of the corresponding segment can be realized thereby. In particular, the friction can be selected as sufficiently low so that convenient operation of the air outlet, particularly the positioning of the air guide element, is possible. On the other hand, the friction can be selected as sufficiently high so that an inadvertent adjusting movement of the corresponding segment is prevented, rattling of the segments by a (slight) angular movement is prevented, and a too light ("gentle") actuation of the actuating device is avoided. A rubber material, a foam material, or an injected foam material, for example, is possible as an insertion device. It is also possible to provide the material surfaces with a covering, for example, of a rubber material or a rubber-like material. It is also possible, for example, to form a roughened surface (e.g., by roughening) on an injection-molded article with the use of a suitable process.

Expediently, in a two-channel embodiment of the air outlet, the segments are placed concentrically around the inner air guide channel.

In an embodiment, the segments are configured in each case as a disk element, which is formed from at least one ring element, which has a number of radially disposed ribs, which correspond to the number of vanes.

In this case, the ring element in a possible embodiment can be formed as an inner ring element with at least one rib pointing radially outward with a single vane or with a plurality of ribs in the case of a plurality of vanes. Alternatively, each disk element can be formed from an inner ring element and an outer ring element disposed concentrically around it, between which at least one rib or a plurality of ribs are disposed radially.

Expediently, the air outlet can be formed with at least one driver device, which imparts a movement between at least two of the axially successively disposed segments. In the case of the driver device, it can be especially a device that causes a driving of the adjacent segment, as soon as a certain displacement angle region between the two adjacent segments would be exceeded. The allowable angle range for the rotation of adjacent segments can be defined, for example, according to the allowable stagger angle (which need not coincide absolutely with the average stagger angle). It is also possible to select the allowable angle range higher by a certain factor. For example, an angle of 0° is conceivable as the lower limit for the allowable angle range. This makes it possible that in the "direct air" mode the individual segments are disposed optimally aligned one behind the other. In this case, the driver device in other respects can serve in addition as a stop for the actuation of the actuating device. With a corresponding dimensioning of the allowable angle range (whereby the allowable angle range can also be different from segment to segment), a corresponding functionality can also be realized for the "diffuse" mode. In particular, the driver device can function at least in part as the angular staggering positioning device.

To form the fan-shaped air guiding surface from the segments of a vane by their corresponding position, the specific inner ring element can be provided with a recess, in which a pin of the inner ring element of the segment following axially in the direction of flow can be moved angularly between the position that brings about the "diffuse" mode and the position that brings about the "total air" mode. For this purpose, the segments can be formed especially of largely identical disk elements, which are disposed one above the other in the assembled state.

It is possible to provide at least one actuating element, which is formed preferably integral, preferably as one part and/or as one piece with a drive segment. As a result, the user can be given an especially immediately and directly acting possibility for setting the air outlet to his individual wishes. Moreover, the air outlet can be formed especially simply and cost-effectively.

The segments can be placed one on top of another axially in the flow direction can be moved progressively or sequentially, particularly rotated, by means of an actuating element or adjusting element. In this case, the segments are rotated angularly by successive adjustments, particularly an angular rotation between the one position forming a fan-like air guiding surface (="diffuse" mode) and the other position forming a largely straight air guiding surface (="total air" mode). The adjustment occurs substantially in such a way that an adjustment, particularly a rotation of a first segment according to an established adjustment or rotation path, activates the driving of a second segment which is adjacent to the first segment and which in turn according to an established adjustment or rotation pathway activates the driving of a third segment adjacent to the second segment. This can be continued until the next to the last segment has adjusted or rotated the last segment.

Expediently, the actuating element can be placed in the middle on the axially last segment in the flow direction and formed as an actuating or adjusting ring. The segments can be moved angularly to one another by the vane segments connected axially to one another via the recess and pin and adjustment, particularly rotation of the last segment by means of the actuating element, so that in the "diffuse" mode a fan-shaped air guiding surface or in the "total air" mode a largely straight air guiding surface is formed.

In this case, the actuating element can be provided, for example, with pins which engage in the recesses of the last segment of the movable vane wheel and can be lockable in these to avoid canting. Moreover, the actuating element on the flow exit side has a shaped edge, which is provided, for example, with a corresponding structure, e.g., a gripping structure, which enables simple operation. In addition, the actuating element on the flow exit side can be provided with fixed or adjustable bars or fins. These are used in particular for reinforcing the ring-shaped actuating element.

In another embodiment, a spring element can be disposed between the actuating element and the last segment. It is assured in this way that in the assembled and locked state of the actuating element the segments stacked on each other are disposed without gaps on each other.

In a possible design form of the air outlet, the segments can follow a predefined edge contouring, especially an air guide channel contouring and/or a housing contouring. In other words, the inside diameter or outside diameter of the segments can be selected as different in size. As a result, the available space can be utilized optimally. In particular, the pressure drop of the air flowing through the air outlet can be reduced. Hollow spaces that are not ventilated or only poorly ventilated can also be avoided, which, for example, could lead to a buildup of bacteria, which in turn could lead to bad odors. For example, the outer contouring of segments disposed next to one another could be made in the shape of a spherical segment, to be adapted to a partially spherical hollow space.

In another possible embodiment, the outer ring elements of several axially successively disposed segments form the inner wall of the outer air guide channel. Moreover, the inner ring elements of several axially successively disposed segments form the inner wall of the inner air guide channel. Alternatively or in addition, the segments and thereby the disk elements can be surrounded by a substantially spherical segment housing, whereby the disk elements in each case can be formed only from an inner ring element with ribs disposed radially outward or from an outer and inner ring element with ribs disposed radially in-between.

To direct the flow at the exit from the air outlet, the outer air guide channel can be surrounded by a substantially spherical housing, in which the outer air guide channel, i.e., its surrounding segment housing or its outer, especially spherical ring elements, is pivotable like a ball joint. The spherical housing of the air outlet forms a ball socket, in which the spherical segment housing with the segments disposed therein or the spherical ring elements without additional housing are pivotable. Through the actuating element placed outwardly on the last segment and optionally on the segment housing and lockable on it, the air guide element in the spherical housing of the air outlet can be adjusted in several rotational degrees of freedom by moving the actuating element both radially and angularly and adjusting the air guide element accordingly in the housing relative to the longitudinal axis of the air guide channel. Any direction of flow can be adjusted by the radial adjustment and/or any type of flow for the air outlet by the angular adjustment.

In another advantageous embodiment, the ribs are formed flat and disposed inclined to the flow cross section. Alternatively, the ribs can be formed convex and disposed perpendicular to the flow cross section. The ribs can also be made from a flexible, particularly elastic material, so that they can be wound by rotation.

In an embodiment of the invention, a plurality of similar or different air guide elements can be disposed axially behind one another and/or next to one another. In an arrangement of air guide elements, parallel next to one another, the air outlet is made as a double nozzle. In a plurality of axially successively disposed air guide elements, and therefore a plurality of axially successively disposed vane wheels, adjustment of the segments into the form of a multiple helix in particular is made possible. Expediently, the air guide elements can be moved asynchronously or synchronously by means of separate operating elements and/or a mutual actuating element. Valves or fins or other suitable air guide elements can also be disposed before and/or behind the vane wheel(s) in the air guide channel. In particular, the inner ring element serving as the inner air guide channel is provided with a valve, which completely closes or opens the inner air guide channel for setting a directed flow.

In the area of the air guide element, to increase the flow cross section, the air outlet and thereby its air guide channel can be made substantially spherical, whereby a cylindrical air guide channel opens into it on the flow entry side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 25 shows schematically in a cross-section view another exemplary embodiment of a ray ring with an integrated bearing bushing;

FIG. 26 shows a schematic illustration of different possible arrangements of air channels with a vane wheel and additional spot air channels;

DETAILED DESCRIPTION

Figure 1:
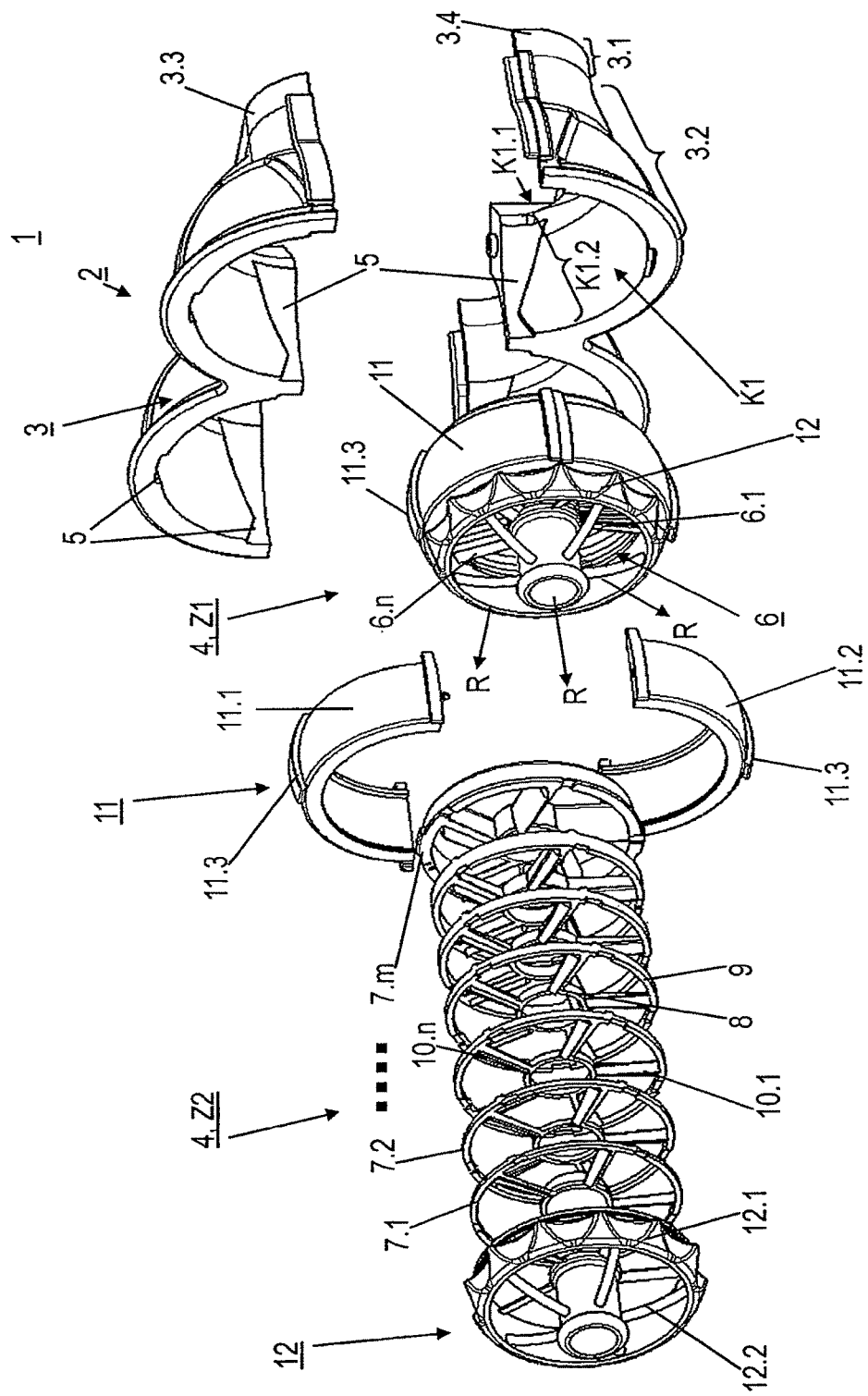
FIG. 1 shows schematically in an exploded diagram an air outlet formed as a double nozzle with an air guide element formed as a vane wheel, whose axially successively disposed segments can be moved angularly relative to one another.

Parts corresponding to one another are provided with the same reference characters in all figures.

FIG. 1 shows in an exploded view of an air outlet 1 formed as a double nozzle 2. Alternatively, air outlet 1 can also be formed as a single nozzle in a form not illustrated in greater detail. The invention will be described in greater detail based on the structure of one of the nozzles.

Air outlet 1 has per nozzle an air guide channel K1, which on the flow entry side has a hollow cylindrical section K1.1 and on the flow exit side a spherical section K1.2. Moreover, air outlet 1 has a housing 3, which in analogy to the shape of air guide channel K1 has a hollow cylindrical section 3.1 on the flow entry side and a spherical section 3.2 on the flow exit side. Housing 3 is formed, for example, from two half-shells 3.3 and 3.4. Housing 3 can be made, for example, from a plastic molded part or another suitable material.

An air guide element 4 for setting the different flow types and/or flow directions R is disposed in the spherical section K1.2 of air guide channel K1 and therefore of spherical section 3.2 of housing 3. In this regard, air guide element 4 in the outer contour has a substantially spherical form and is placed rotatable like a ball joint in spherical section 3.2 of housing 3. Air outlet 1 is therefore also called a ball nozzle.

To adjust the flow direction R of air outlet 1, guide beads 5 are introduced on the inside in the specific half-shell 3.3 and 3.4. Depending on the specification of the settable degrees of freedom, a corresponding number of guide beads 5 are introduced. A corresponding flow direction R or flow type (diffuse flow or directed flow) is set at air outlet 1 on the flow exit side of air outlet 1 by a translator movement of air guide element 3 upward, downward, or to the side, and/or by a rotary movement.

Air guide element 4 is shown in FIG. 1 both in the assembled state Z1 and for better illustration of the structure of air guide element 4 in the disassembled state Z2.

Air guide element 3 is made like a vane wheel 6 with a predefined number of vanes 6.1 to 6.n. In this case, vane wheel 6 and therefore each of the vanes 6.1 to 6.n are formed by a predefined number of axially successively disposed segments 7.1 to 7.m. The particular segment 7.1 to 7.m is made as a disk element, which in the exemplary embodiment according to FIG. 1 has an inner ring element 8 and an outer ring element 9 disposed concentrically around the inner element, between which a predefined number of ribs 10.1 to 10.n are disposed radially. In this case, the inner ring element 8 can form in addition an inner air guide channel K2. Moreover, the number of ribs 10.1 to 10.n of a segment 7.1 to 7.m corresponds to the number of vanes 6.1 to 6.n. In an alternative embodiment, not shown in greater detail, segments 7.1 to 7.m can each be formed from an inner ring element 8, on which ribs 10.1 to 10.n pointing radially outward are disposed.

Segments 7.1 to 7.m, as shown in FIG. 1, can be surrounded by a segment housing 11, in which segments 7.1 to 7.m can be moved angularly at least relative to one another. Segment housing 11 for a simple assembly is made of multiple parts, particularly two-shelled from a first half-shell 11.1 and a second half-shell 11.2, which can be plugged in one on top of another. Segment housing 11 is provided with outwardly projecting guide ribs 11.3, which are guided in guide beads 5 of housing 3 and are used for setting the flow direction R by moving air guide element 4.

To set the flow type ("diffuse" mode and "total air" mode or an intermediate setting), an actuating element 12 in the form of an adjusting ring can be placed centrally on the axially last segment 7.1 in flow direction R. Segments 7.1 to 7.m, connectable axially behind and to one another, can be moved angularly relative to one another by moving, particularly rotating the last segment 7.1 by means of actuating element 12, so that in the "diffuse" mode a fan-shaped air guiding surface or in the "total air" mode a largely straight air guiding surface is formed.

For fixation of actuating element 12 on last segment 7.1, actuating elements 12 can be provided, for example, with pins in a manner not illustrated in greater detail, which engage in recesses of the last segment 7.1 and can be locked in said recesses to avoid canting. Moreover, actuating element 12 on the flow exit side has a shaped edge 12.1, which is provided, for example, with a corresponding structure, e.g., gripping structure. In addition, actuating element 12 on the flow exit side can be provided with fixed or adjustable bars 12.2 or fins.

Figure 2:
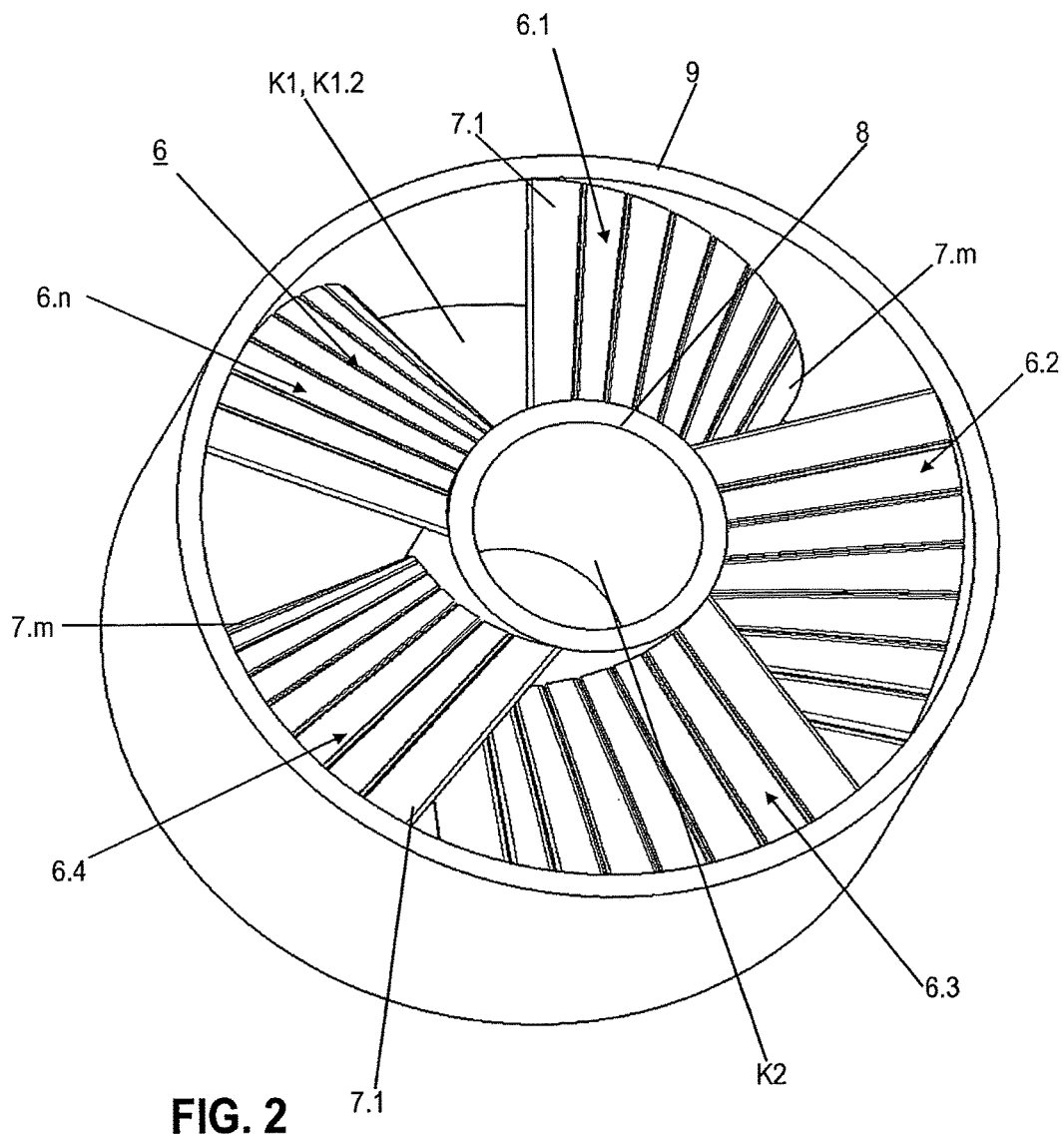
FIG. 2 shows schematically the vane wheel according to FIG. 1 in a perspective illustration in the assembled state in the "diffuse" mode position.

FIG. 2 shows schematically vane wheel 6 according to FIG. 1 in a perspective illustration in the assembled state in the "diffuse" mode setting. In this end position, segments 7.1 to 7.m of the respective vane 6.1 to 6.n are moved angularly in such a way that a fan-shaped or helix-shaped air guiding surface in flow direction R forms to achieve a vortex flow.

Figure 3:
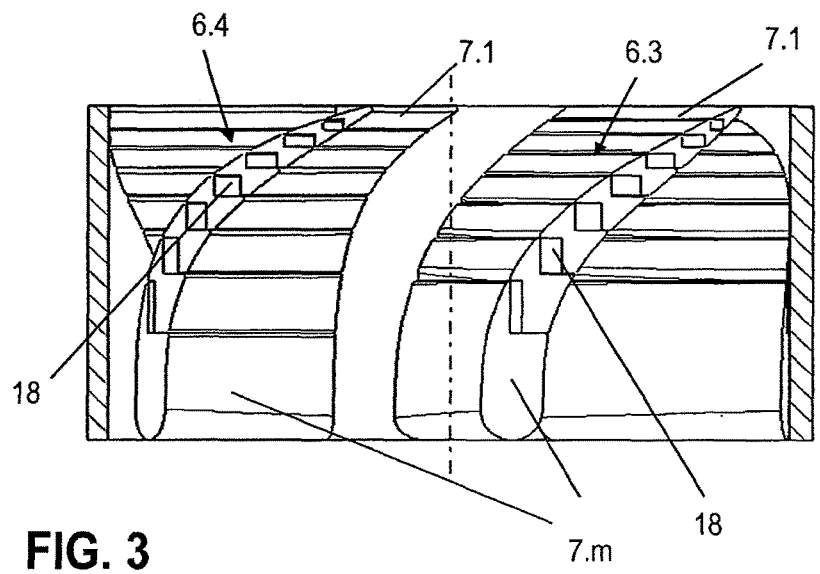
FIG. 3 shows schematically the vane wheel in section III according to FIG. 4.
Figure 4:
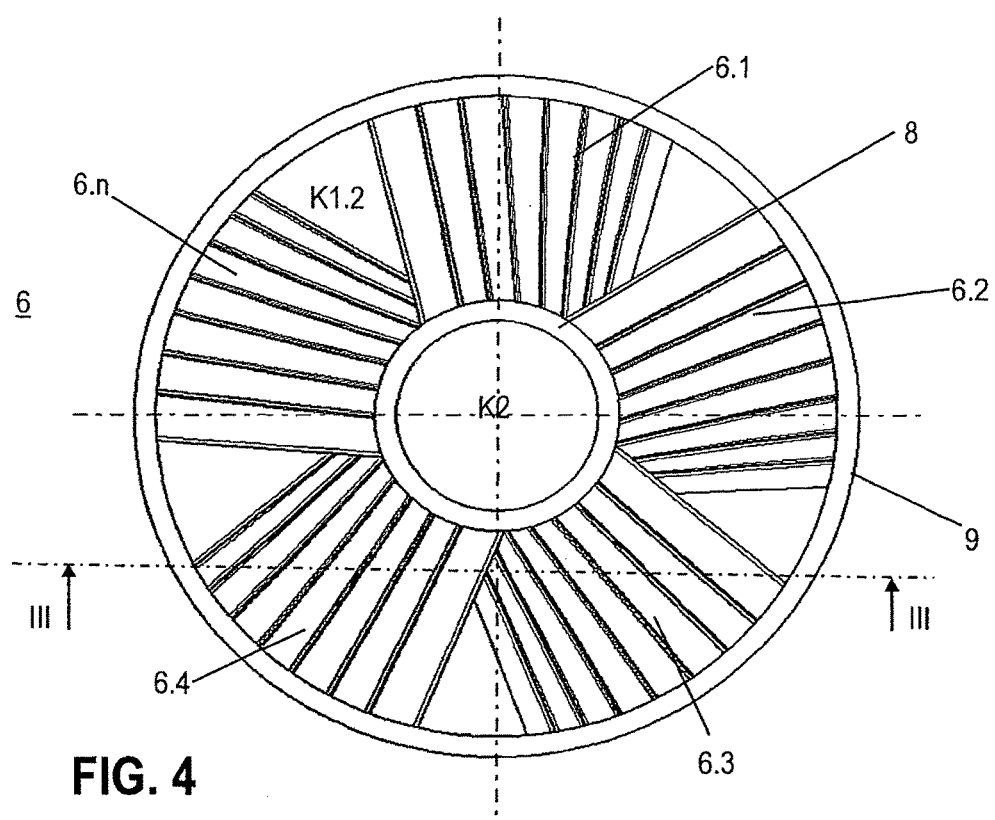
FIG. 4 shows schematically the vane wheel according to FIG. 2 in a plan view in the assembled state in the "diffuse" mode position.

FIG. 3 shows schematically vane wheel 6 in the assembled state with segments 7.1 to 7.m, positioned in the "diffuse" mode position, of the respective vane 6.1 to 6.n in section III according to FIG. 4. FIG. 4 shows schematically vane wheel 6 according to FIG. 2 in a plan view with segments 7.1 to 7.m positioned in the "diffuse" mode position. In this case, segments 7.1 to 7.m of vanes 6.1 to 6.n reduce the flow cross section maximally at a maximum swirling of the air current by the fan-shaped air guiding surface of the respective vane 6.1 to 6.n. Hollow spaces 18 arising in the "diffuse" position due to the embodiment of segments 7.1 to 7.m are made smaller or disappear during the transition to the "total" position in a totally nested position of segments 7.1 to 7.m.

Figure 5:
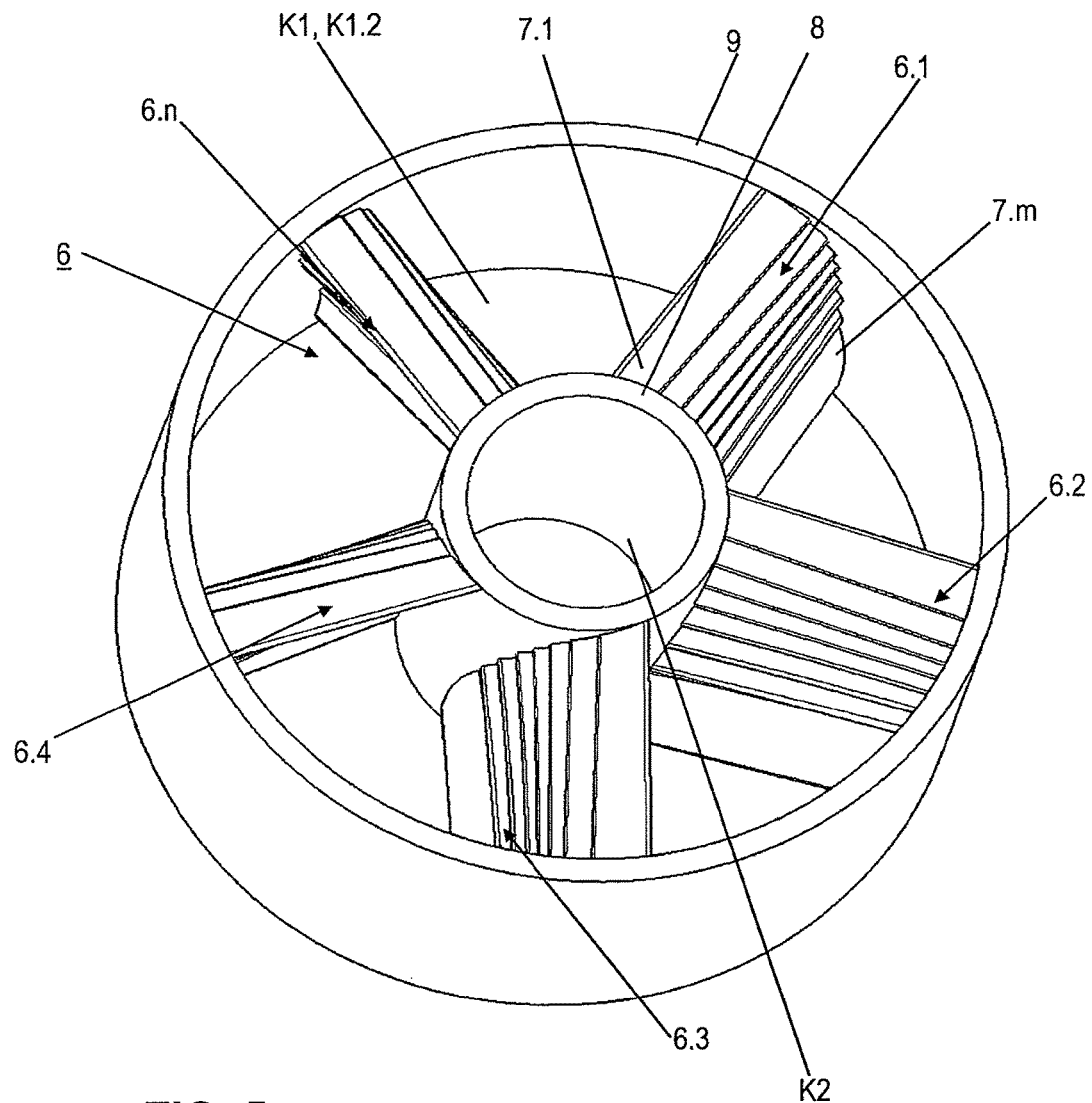
FIG. 5 shows schematically the vane wheel according to FIG. 1 in a perspective illustration in the assembled state in the "total air" mode position.
Figure 6:
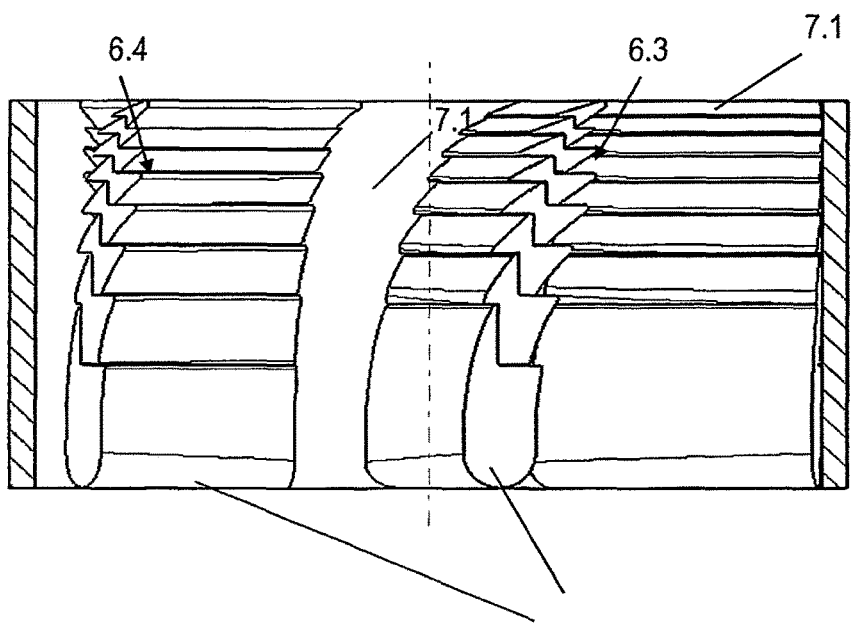
FIG. 6 shows schematically the vane wheel in section VI according to FIG. 7.
Figure 7:
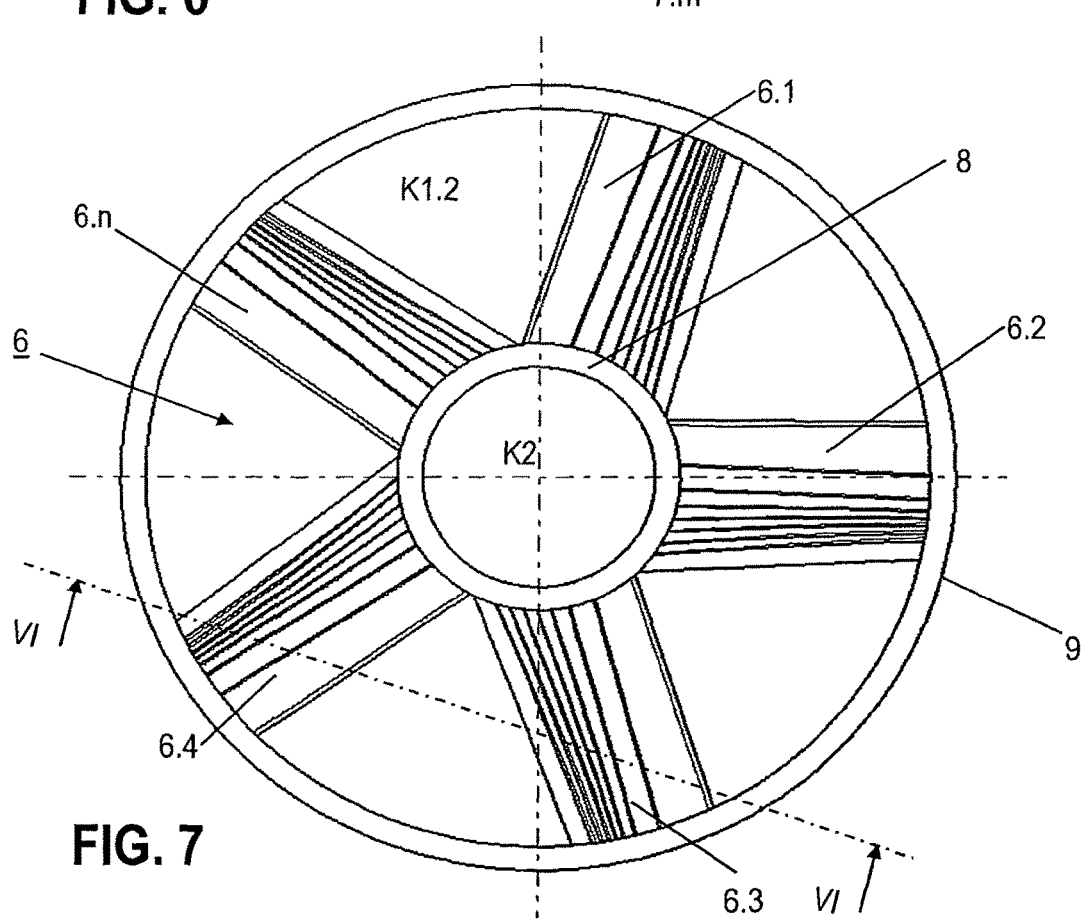
FIG. 7 shows schematically the vane wheel according to FIG. 5 in a plan view in the assembled state in the "total air" mode position.

FIGS. 5-11 illustrate the vane wheel 6 according to the embodiment in FIG. 1 in further detail. FIG. 5 shows schematically vane wheel 6 according to FIG. 1 in a perspective illustration in the assembled state with segments 7.1 to 7.m positioned in the "total air" mode position. In FIG. 6, vane wheel 6 is shown in section VI according to FIG. 7 and FIG. 7 shows vane wheel 6 according to FIG. 5 in a plan view with segments 7.1 to 7.m positioned in the "total air" mode position. In this case, segments 7.1 to 7.m of vanes 6.1 to 6.n reduce the flow cross section minimally with minimal swirling of the air stream, so that a largely directed flow results in the outer air guide channel K1.2. In this position, segments 7.1 to 7.m are disposed largely perpendicular one above the other in flow direction R, so that a largely linear air guiding surface for the particular vane 6.1 to 6.n results.

Figure 8:
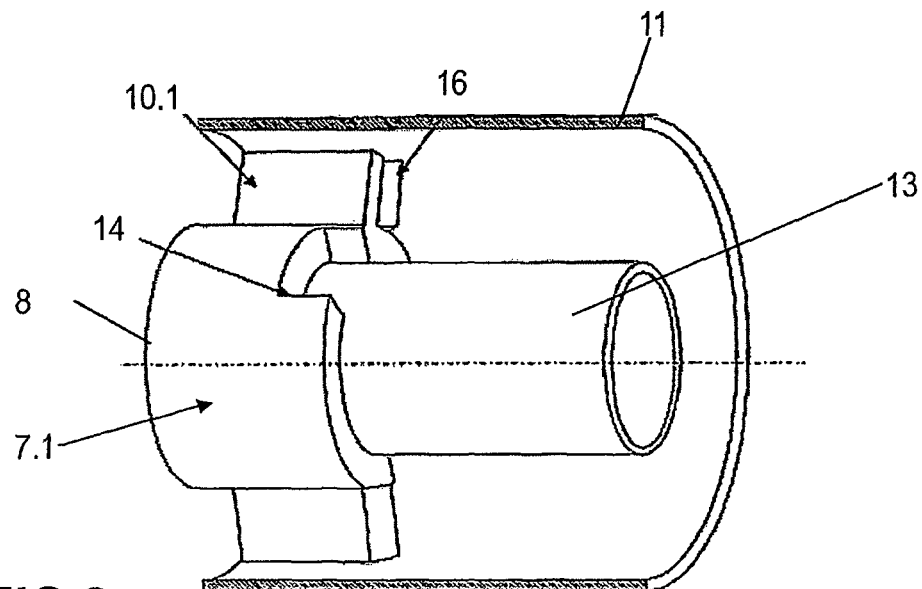
FIG. 8 shows schematically in a perspective illustration in a cut-open housing a vane wheel segment disposed therein on an inner ring element.

FIG. 8 shows schematically in a perspective illustration in a cut-open segment housing 11 an exemplary embodiment for a segment 7.1 disposed in segment housing 11 with an inner ring element 8 and radially outwardly pointing ribs 10.1 to 10.n. Segment housing 11, in this case, with segments 7.1 to 7.m disposed therein can be made as an integrated part, e.g., an injection-molded article, which is mounted movable in housing 3, used as a ball joint, of air outlet 1. FIGS. 8-11 illustrate the segments 7.1 to 7.m of the embodiment in FIG. 1 in further detail.

Figure 9:
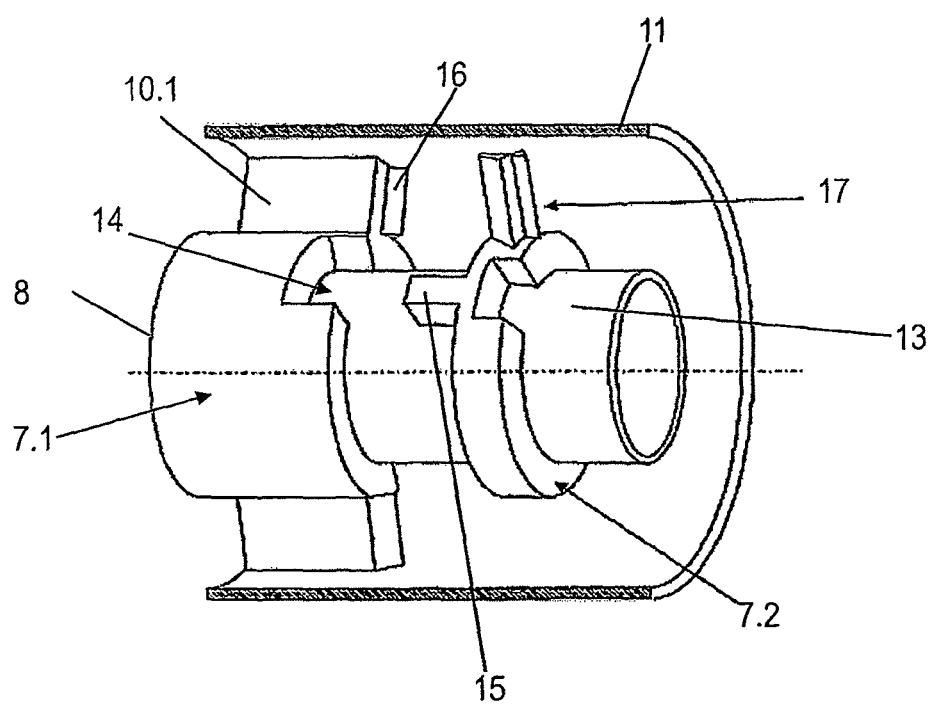
FIG. 9 shows schematically in a perspective illustration in a cut-open housing another vane wheel segment which can be placed in the axial direction on the segment disposed on the inner ring element.

The inner ring element 8 in this example is disposed on a hollow cylinder 13 acting, as an inner air guide channel K2. For connection of the axially successively disposed segments 7.1 to 7.m, the respective segment 7.1 to 7.m has a recess 14. A pin 15 of an inner ring element 7.2 following axially in the flow direction R, as shown in FIG. 9, engages in said recess 14. In this case, the walls of recess 14 act as stops for the position that brings about the "diffuse" mode and the position that brings about the "total air" mode.

Alternatively or in addition, ribs 10.1 to 10.n, corresponding to one another, of a respective vane 6.1 to 6.n of axially adjacent segments 7.1 to 7.m are provided with stops 16 and 17 corresponding to one another, as shown in FIGS. 8 and 9.

Figure 10:
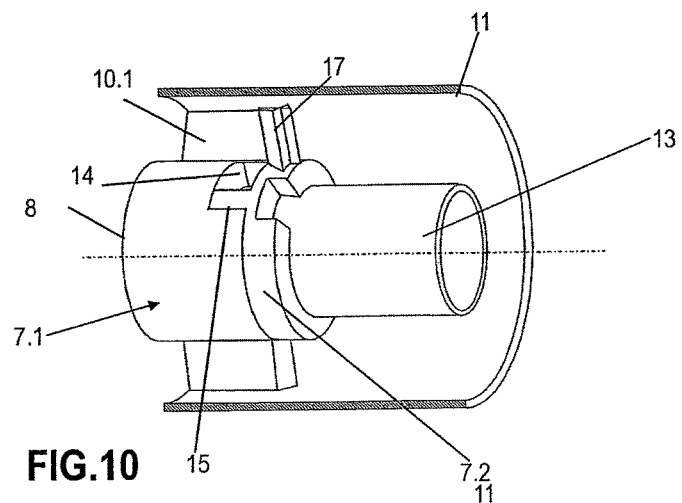
FIG. 10 shows schematically in a perspective illustration in a cut-open housing two vane wheel segments placed one on top of another in the "diffuse" mode position.
Figure 11:
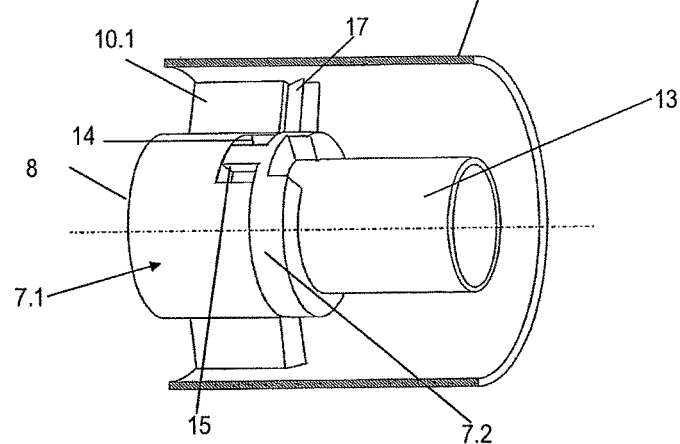
FIG. 11 shows schematically in a perspective illustration in a cut-open housing two vane wheel segments placed one on top of another in an intermediate position between the "diffuse" mode position and the "total air" mode position.

FIG. 10 shows in a perspective illustration in a cut-open segment housing 11, two segments 7.1 and 7.2, placed one on top of the other, of vane wheel 6 in the "diffuse" mode position and FIG. 11 two segments 7.1 and 7.2, placed one on top of the other, in an intermediate position between the "diffuse" mode position and the "total air" mode position.

Figure 12:
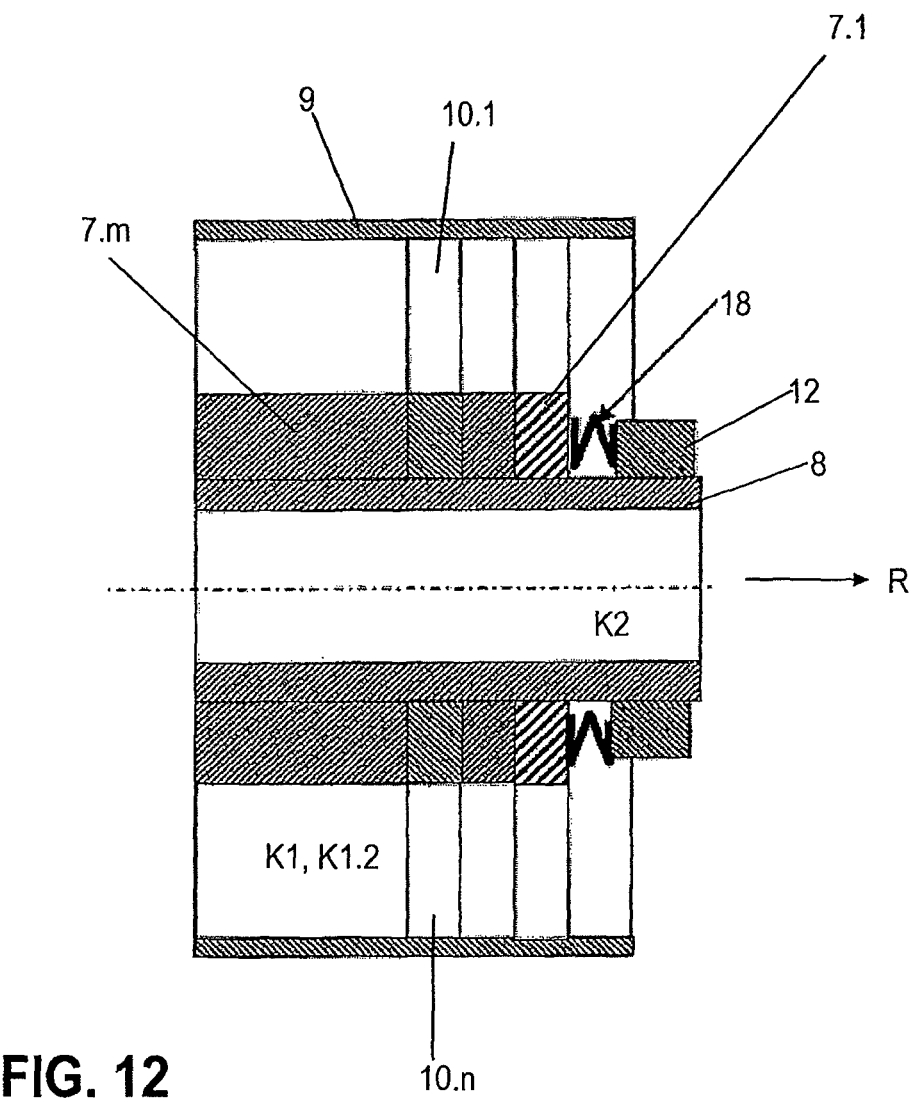
FIG. 12 shows schematically in a longitudinal section an embodiment for an air outlet with a plurality of segments, which are placed on an inner ring element and which can be adjusted angularly by an actuating element placed on the last ring element on the flow exit side.

FIG. 12 shows another embodiment for air guide element 4 in the longitudinal section with a plurality of segments 7.1 to 7.m, placed axially one on top of another on a hollow cylinder 13 forming an inner air guide channel K2, said segments which can be moved angularly by an actuating element 12 placed on the last segment 7.1 on the flow exit side. In this case, a spring element 18 is disposed between the last segment 7.1 and actuating element 12; the spring element presses together segments 7.1 to 7.m in the axial direction largely without gaps with a locked actuating element 12, so that with the angular movement of segments 7.1 to 7.m, ribs 10.1 to 10.n of adjacent segments 7.1 to 7.m form a largely air-tight air guiding surface.

Depending on the specification, ribs 10.1 to 10.n can be formed flat and inclined toward the flow cross section. Alternatively, ribs 10.1 to 10.n can be convex and disposed perpendicular to the flow cross section. Moreover, ribs 10.1 to 10.n can be formed rigid or flexible. In a flexible, especially elastic configuration, ribs 10.1 to 10.n can be wound to set a fan-shaped or helix-shaped air guiding surface.

Figure 13:
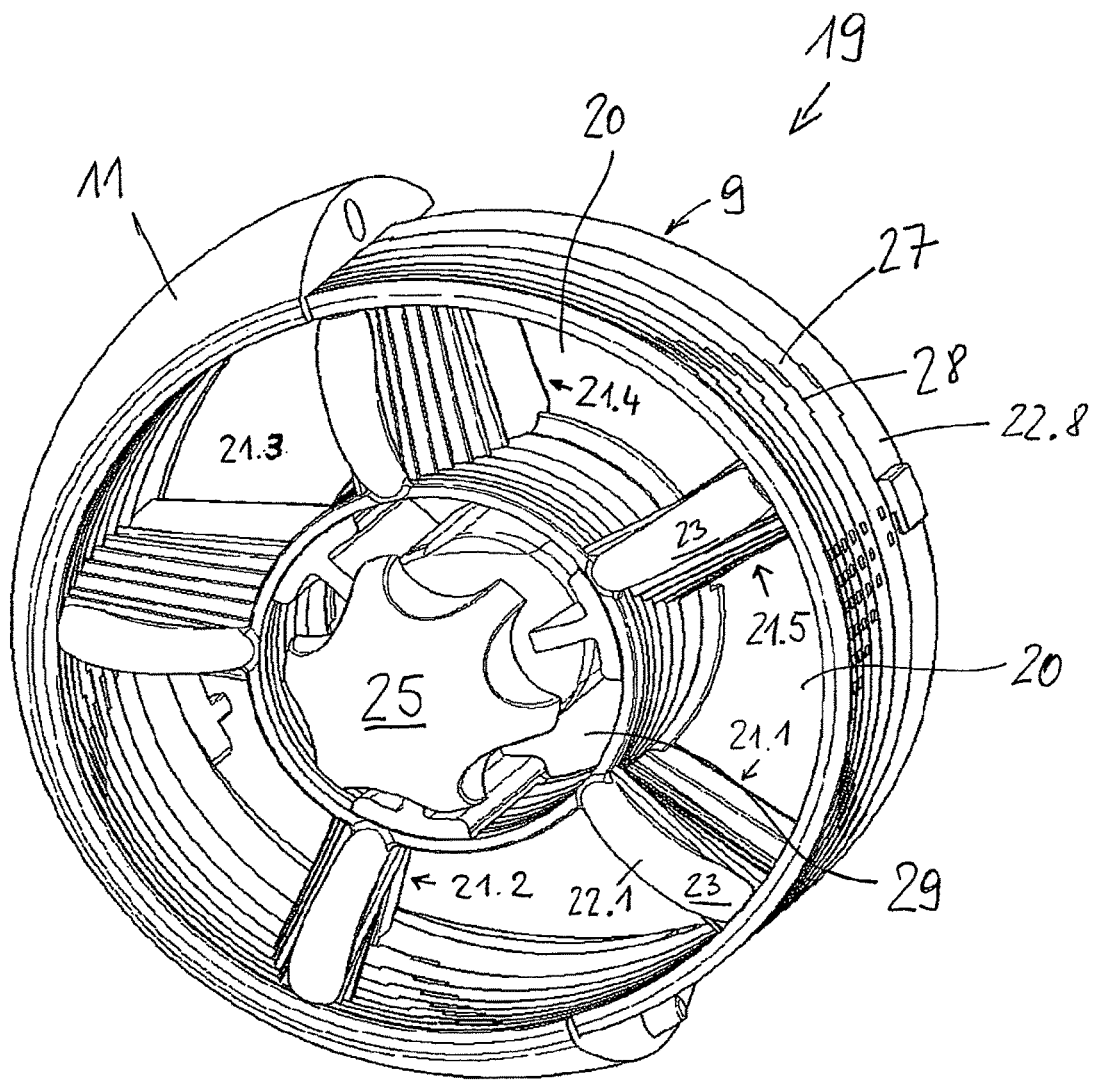
FIG. 13 shows schematically the vane wheel according to a second exemplary embodiment in a partially open perspective illustration in the assembled state in the "total air" mode position.
Figure 14:
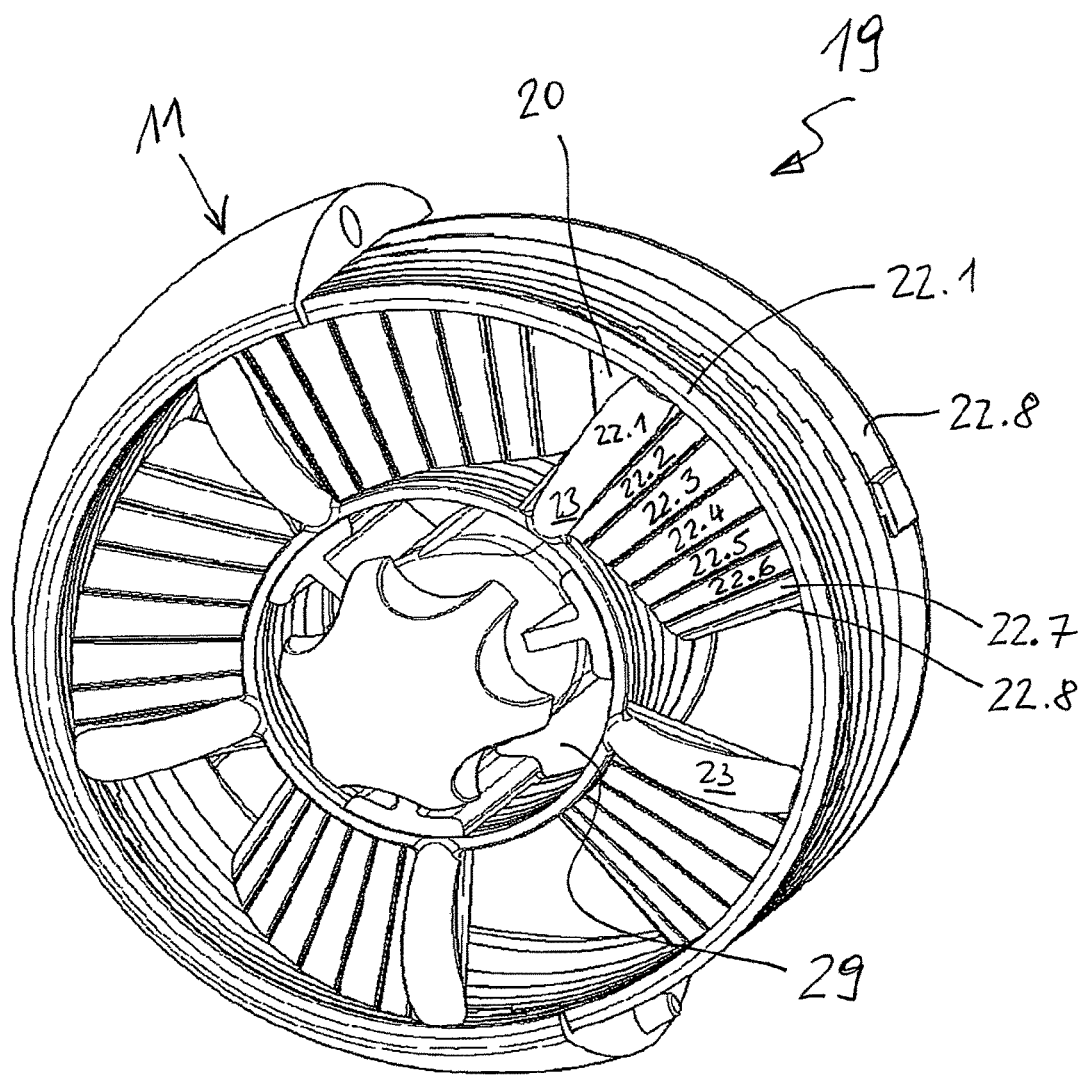
FIG. 14 shows schematically the vane wheel according to FIG. 13 in the "diffuse" mode position.

In FIG. 13 and FIG. 14, another possible exemplary embodiment for an air guide element 19 for an air outlet 1 is illustrated. Air guide element 19 presented hereafter can be used, for example, instead of air guide element 4 shown in FIG. 1. Air guide element 19 is shown in FIG. 13 and FIG. 14 in each case in a perspective view. To make the internal structure of air guide element 19 clearer, segment housing 11 is shown only partially in FIG. 13 and FIG. 14.

Air guide element 19 has an outer, adjustable air channel 20, which in the exemplary embodiment shown in the present case has an approximately ring-shaped cross section. In the outer adjustable air channel 20, in analogy to the exemplary embodiment shown in FIG. 1, a plurality of segment elements (in the present case 8 segment elements) 22.1 to 22.8 are disposed one behind the other when viewed in the axial direction. A set of segment elements 22.1 to 22.8 in each case form a vane 21.1 to 21.5. In the present exemplary embodiment of air guide element 19, vane wheel 21 is formed by a total of five vanes 21.1 to 21.5. Depending on the angular position of segments 22.1 to 22.m to one another, the outer adjustable air channel 20 of air guide element 19 is in the end position of the "direct air" mode, the end position of the "diffuse" mode, or in an intermediate position. FIG. 13 shows air guide element 19 in the "direct air" mode position, whereas FIG. 14 shows air guide element 19 in the "diffuse" mode position.

As can be derived from FIG. 13 and FIG. 14, in the "direct air" mode position (FIG. 13) the individual ribs 23 of the different segments 22.1 to 22.m are disposed substantially aligned to one another when viewed in the axial direction. In the "diffuse" end position (FIG. 14), the individual ribs 23 of segments 7.1 to 7.m, in contrast, are disposed moved angularly to one another, so that vanes 21.1 to 21.5 form a fan-shaped or coil-shaped air guiding surface (in this regard, see particularly also FIG. 19, FIG. 21, and FIG. 22).

An actuating handle 25 is disposed in the middle of air guide element 19. Actuating handle 25 in this case is connected rotationally fixed to segment 22.1 located in front in FIGS. 13 and 14. Accordingly, foremost segment 22.1 can be turned angularly by a rotational movement of actuating handle 25. Rearmost segment 22.8 in the drawing, in contrast, is disposed rigidly. Therefore, an angular offset between foremost segment 22.1 and rearmost segment 22.8 results by a rotation of actuating handle 25.

The rotation of foremost segment 22.1 is thereby "distributed" to the individual segments 22.1 to 22.8. This means that the angular total offset between foremost segment 22.1 and rearmost segment 22.8 is divided into several angular partial offsets, each of which occurs between two adjacent segments 22.i and 22.i+1. This division of the angular total offset into several partial offsets need not necessarily occur such that the angular partial offsets are the same in each case. Rather, the angular partial offsets can be selected as definitely increasing progressively. The angular total offset is reasonably divided in such a way that a most optimal contouring of the individual vanes 21.1 to 21.5 results (cf. particularly FIG. 22).

To effect this division of the angular total offset into a plurality of angular partial offsets, a driver slotted-guide arrangement 26 is formed in the outer ring area 9 of segment 22. To this end, in the present exemplary embodiment, outer ring element 9 of segments 22.1 to 22.8 has a recess 27 in each case on the front. A projection 28 of segment 22 adjacent thereto engages in each case in said recess 27. Projection 28 is formed in each case on the back of outer ring element 9 of corresponding segment 22. Recess 27 has an angular dimension that is greater relative to the corresponding projection 28. As a result, a maximum angle range is defined in that two adjacent segments 22.i and 22.i+1 can be turned against each other. It is pointed out only for the sake of completeness that recess 27 can be omitted in the foremost segment 22.1 or projection 28 in rearmost segment 22.8.

It is evident further in FIG. 13 and FIG. 14 that a spot air channel 29 is provided between actuating handle 25 and the ring-shaped, outer adjustable air channel 20. A directed air flow can be generated with the use of spot air channel 29, regardless of the position of the outer adjustable air channel 20. In so doing, it is naturally possible that spot air channel 29 can also be closed by a flap valve, not shown in the present case. The direction of the directed air flow, which emerges from spot air channel 29 and optionally from the outer adjustable air channel 20 (with a suitable position of vane wheel 21), can be influenced by a displacement movement of actuating handle 25. Air guide element 19 can be turned by this type of displacement movement, for example, within the housing surrounding it.

Figure 15:
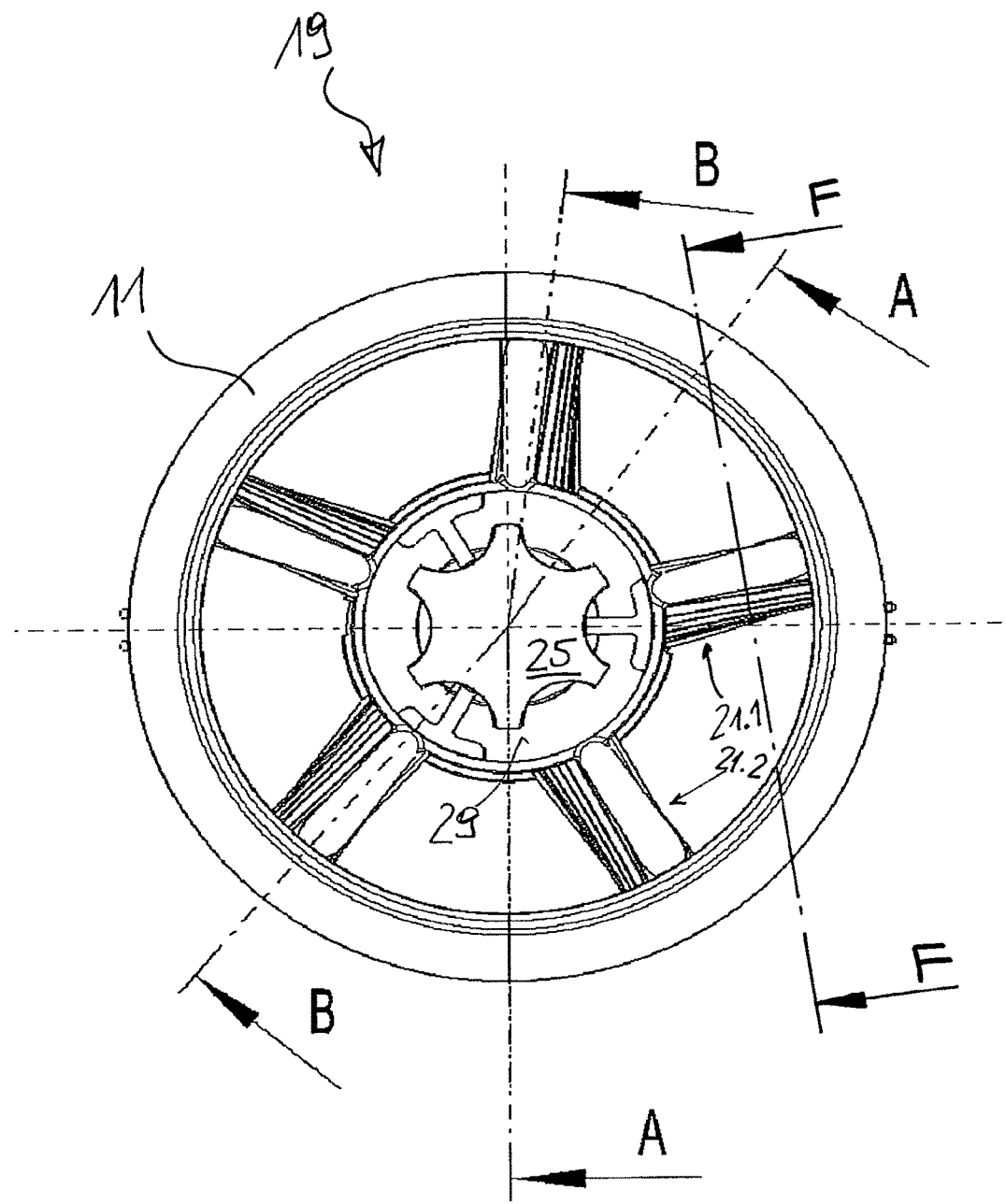
FIG. 15 shows schematically the vane wheel according to FIG. 13 in a plan view in the assembled state in the "direct air" mode position.

In FIG. 15, air guide element 19 shown in FIG. 13 is again evident in a plan view in the "direct air" mode position. In FIG. 15, the cutting planes A, B, and F are drawn in, which define the cross-section views in FIG. 16, FIG. 17, and FIG. 20.

Figure 16:
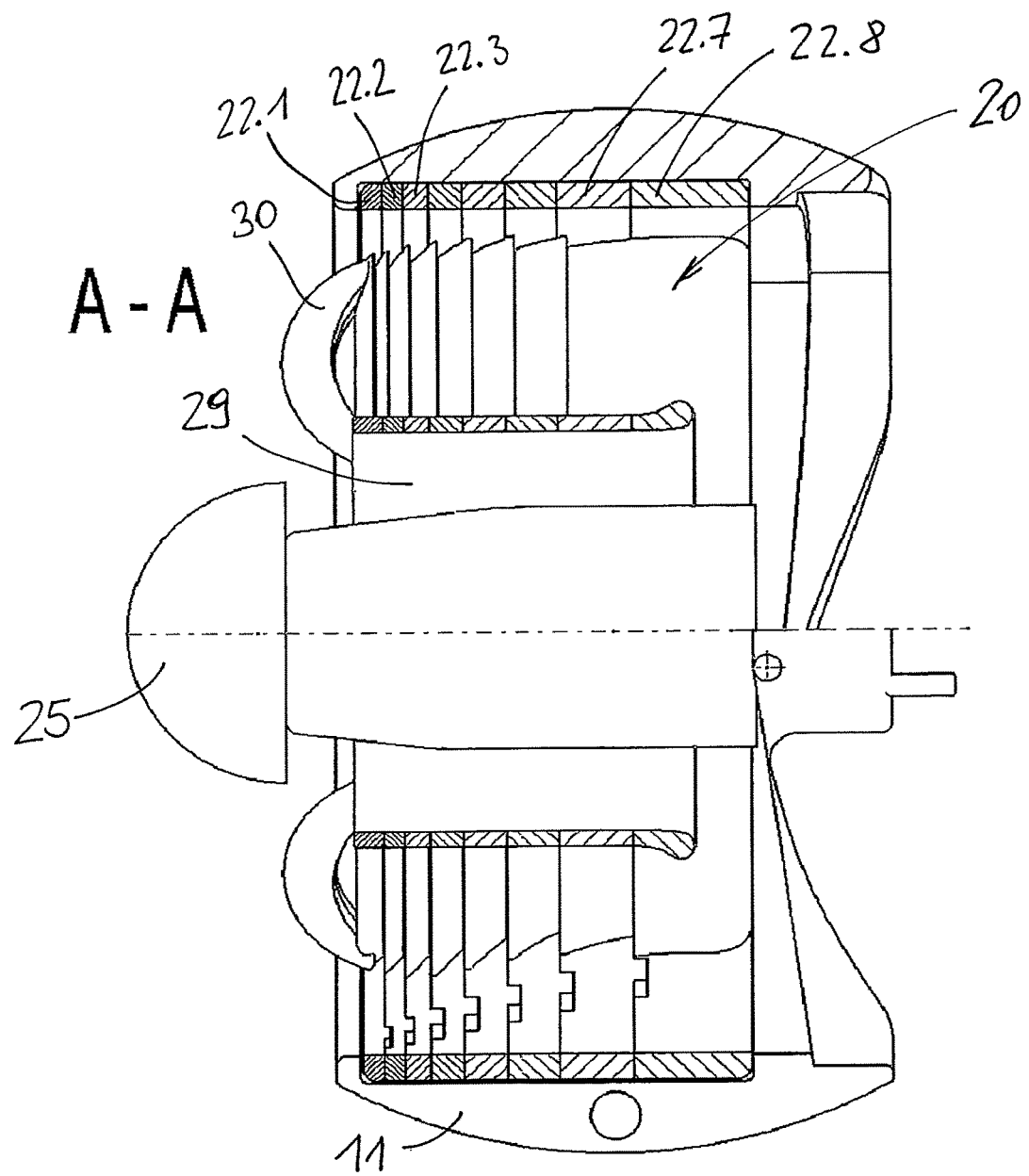
FIG. 16 shows schematically the vane wheel in section A according to FIG. 15.

FIG. 16 shows air guide element 19 along the (angled) cross-section plane A evident in FIG. 15. The coaxial arrangement of outer adjustable air channel 20 and spot air channel 29 is evident in particular. The shape of the foremost segment 22.1 is also readily evident, whereby front arch 30 of foremost segment 22.1 in FIG. 16 is not cut by cross-section plane A (which, in contrast, is the case in FIG. 17). The individual segments 22.1 are shown with different hatching for discernability. A hatching is drawn in FIG. 16 and FIG. 17 only when the corresponding part is cut by cutting plane A (or cutting plane B, respectively). Other parts of segments 22.1 to 22.8 are not hatched, but visible edges are shown as simple lines.

The outer contour of segment housing 11 is also readily evident, which follows an arcuate line.

Figure 17:
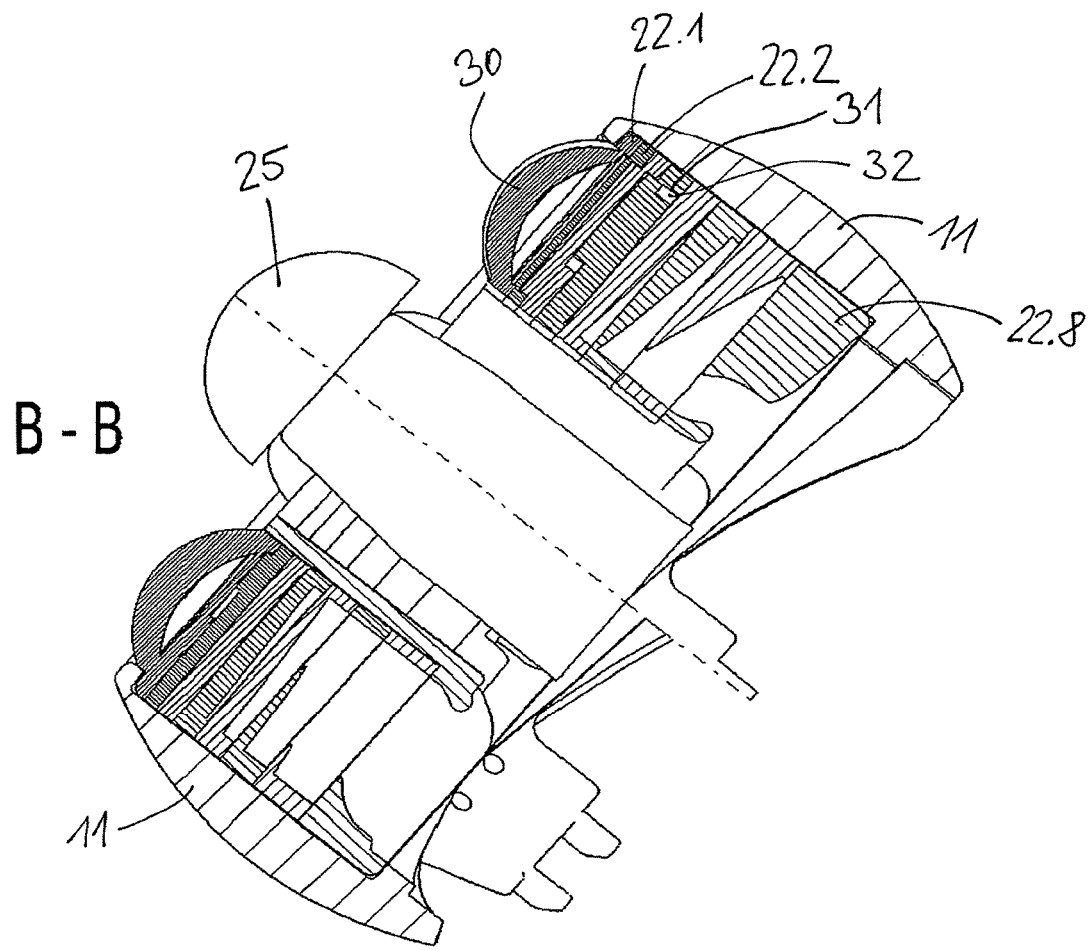
FIG. 17 shows schematically the vane wheel in section B according to FIG. 15.
Figure 18:
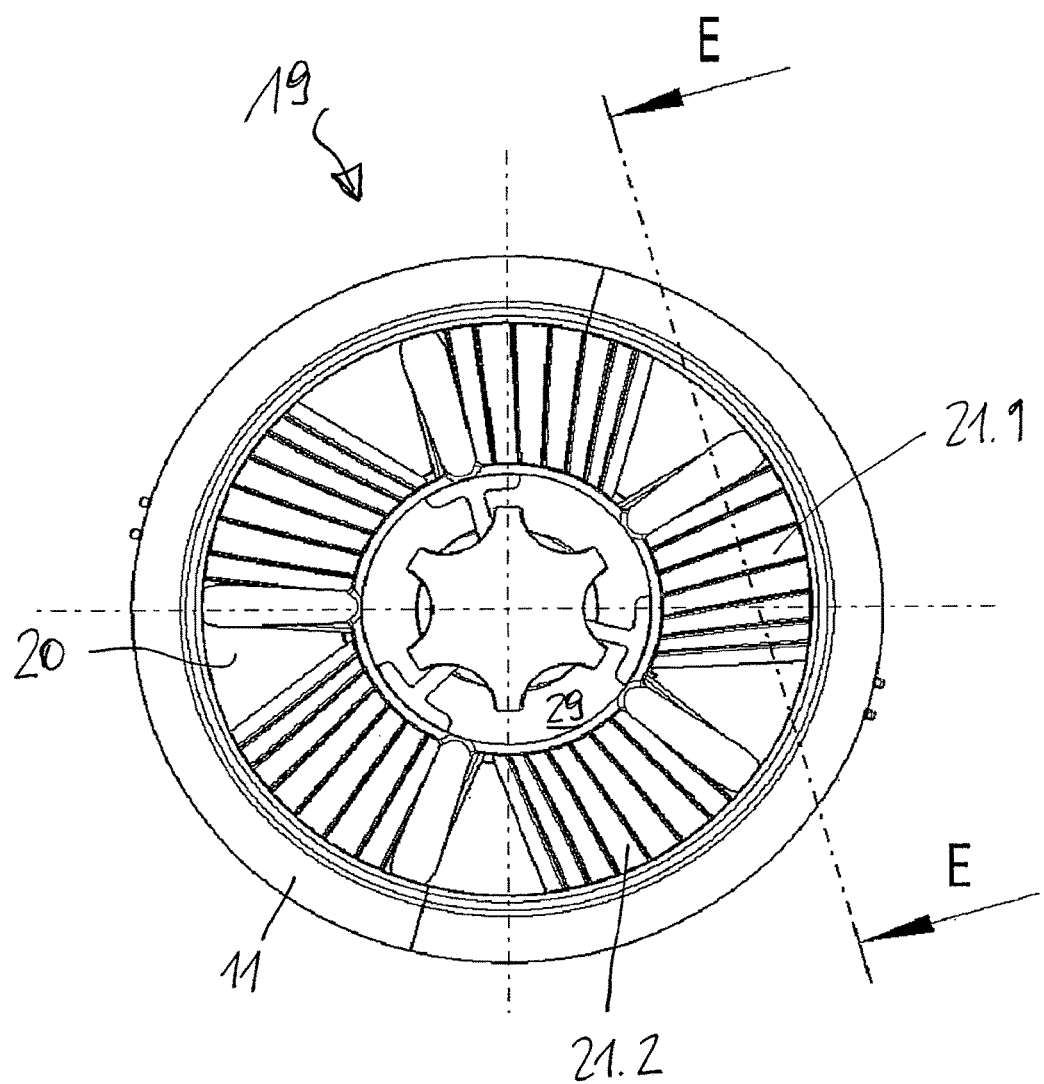
FIG. 18 shows schematically the vane wheel according to FIG. 14 in a plan view in the "diffuse" mode position.
Figure 19:
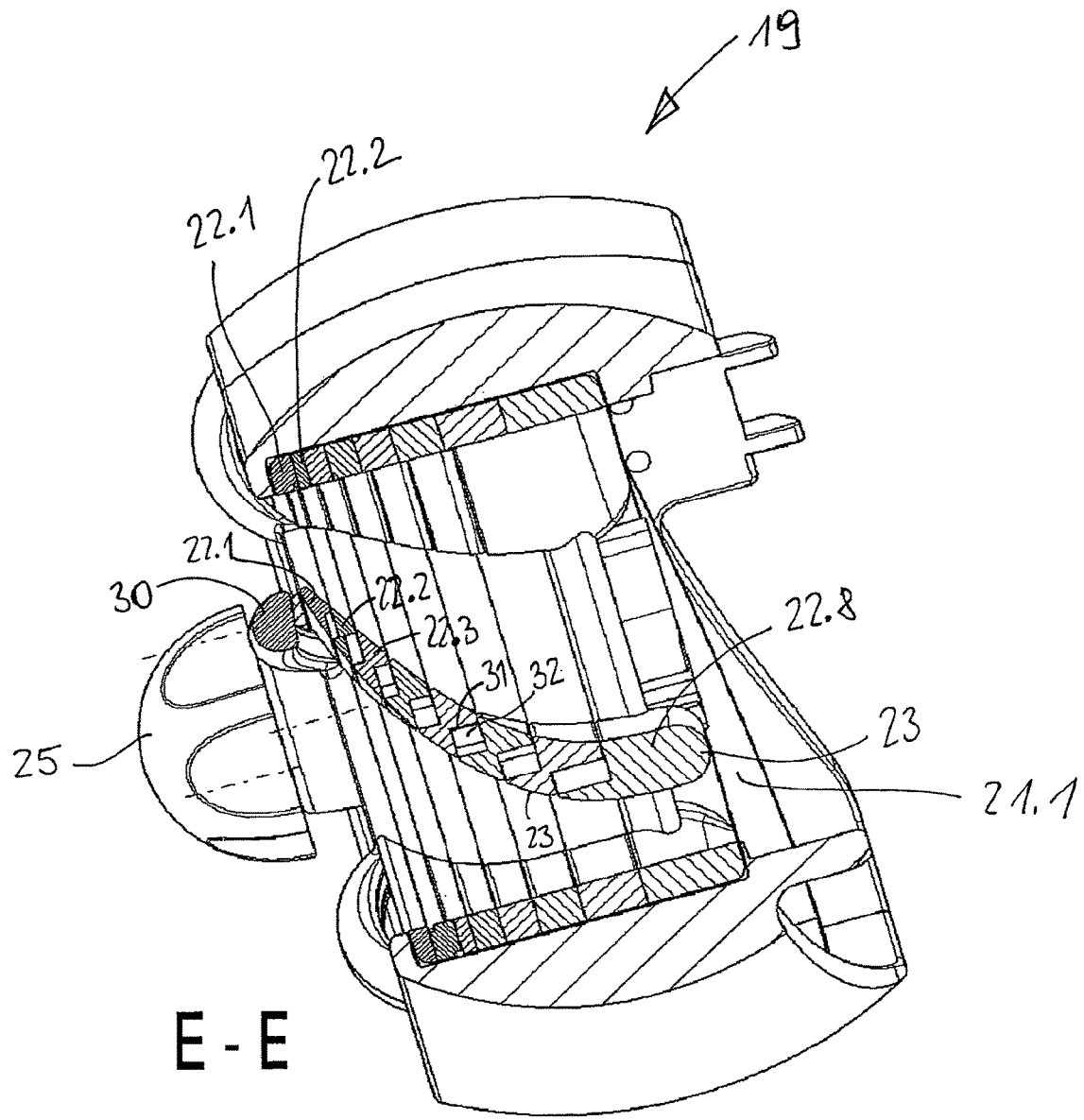
FIG. 19 shows schematically the vane wheel in section E according to FIG. 18.

In FIG. 17, a cross section is shown along the (angled) cross-section area B drawn in FIG. 15. It is clearly evident that the individual segments 22.1 to 22.8 are formed differently. Front arch 30 is formed as one piece with the other parts of foremost segment 22.1. Moreover, foremost segment 22.1, as already mentioned, is connected rotationally fixed to actuating handle 25. In FIG. 17, moreover, hollow spaces 32 can be seen, which are formed by L-shaped cut-outs 31 of adjacent segments 22.i and 22.i+1. FIG. 18 shows a view of air guide element 19 analogous to FIG. 15, whereby air guide element 19 is in the "diffuse" mode position. In particular, the position of the cross-section plane E is shown in FIG. 18, whose cross section is shown in FIG. 19. The internal structure of ribs 23 of segments 22.1 to 22.8 is evident in particular in FIG. 19. The position and arrangement of hollow spaces 32 formed by the L-shaped recesses 31 in ribs 23 of segments 22.1 to 22.8 are also readily evident. Because air guide element 20 in FIG. 19 is in the "diffuse" mode position, the size of hollow space 32 is the maximum.

The surface design of vane 21.1 formed from individual ribs 23 is clearly evident in FIG. 19. Preferably, segments 22.1 to 22.8 are formed so that all vanes 21.1 to 21.5 of vane wheel 21 have a similar shape. It is readily evident that the surface contour of the resulting vane 21.1 is formed largely continuous and flat. As a result, the formation of undesirable swirls in the area of the surface of vane 21.1 is reduced, as a result of which the flow resistance of the air flowing past is reduced and thereby the pressure drop along air guide element 19 is reduced.

Figure 20:
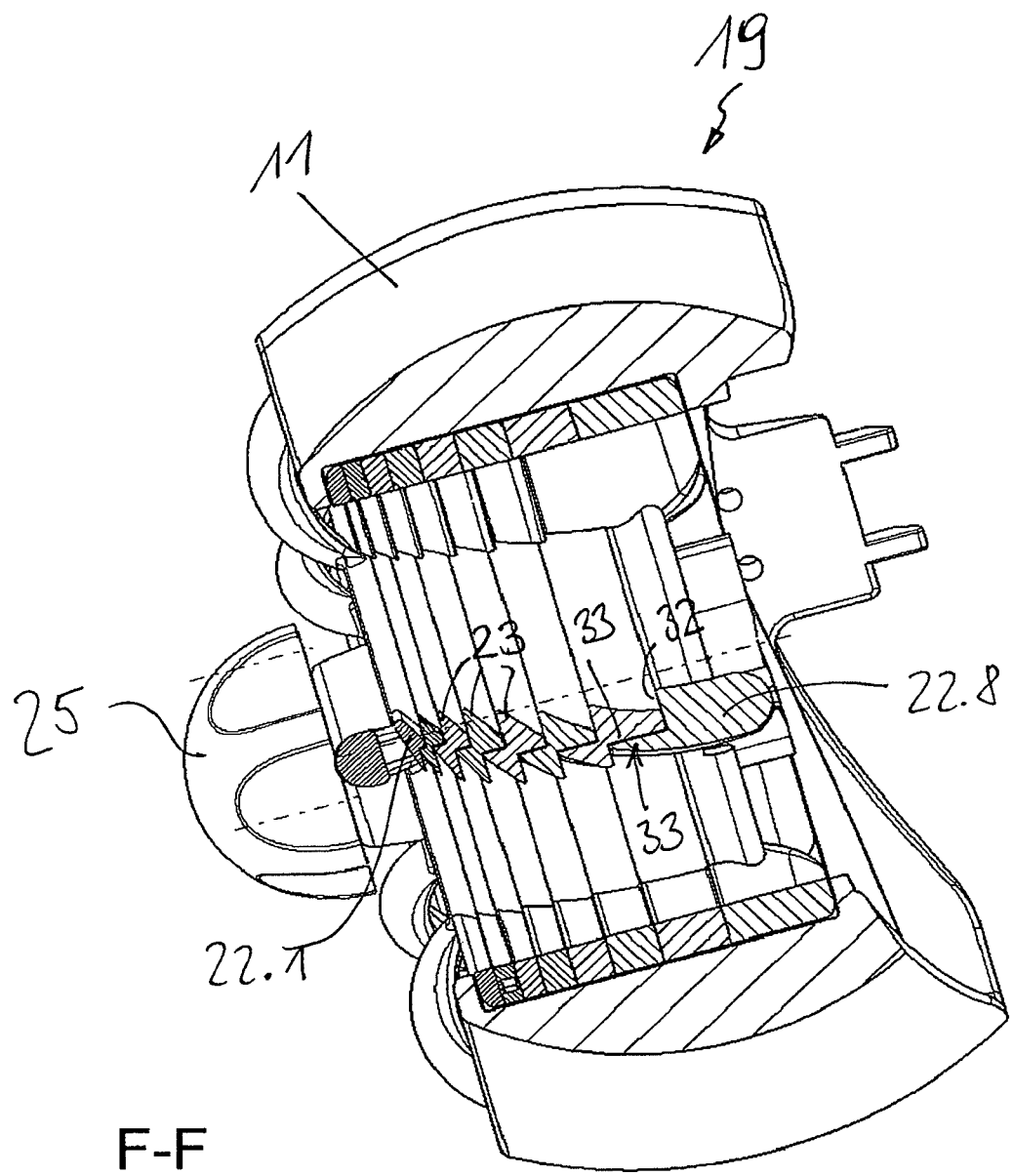
FIG. 20 shows schematically the vane wheel in section F according to FIG. 15, whereby the vane wheel is in the "total air" mode position.

If air guide element 19 is moved by rotation of actuating handle 25 from the "diffuse" mode position in the direction of the "direct air" mode position, ribs 23 of segments 21.1 to 21.8 slide over another until they come to lie disposed substantially aligned one behind the other in the axial direction. This is shown in FIG. 20. The cross-section plane F (cf. FIG. 15) shown there is situated analogous to cross-section plane E (cf. FIG. 18). Only the position of air guide element 19 is different. As can be derived from FIG. 20, hollow spaces 32, formed by the L-shaped cut-outs 31 of ribs 23 of the individual segments 21.1 to 21.8, are substantially closed. In other words, the long sides 33 of the L-shaped cut-out 31 are next to each other. It can represent in addition a stop for the rotation of actuating handle 25.

Figure 21:
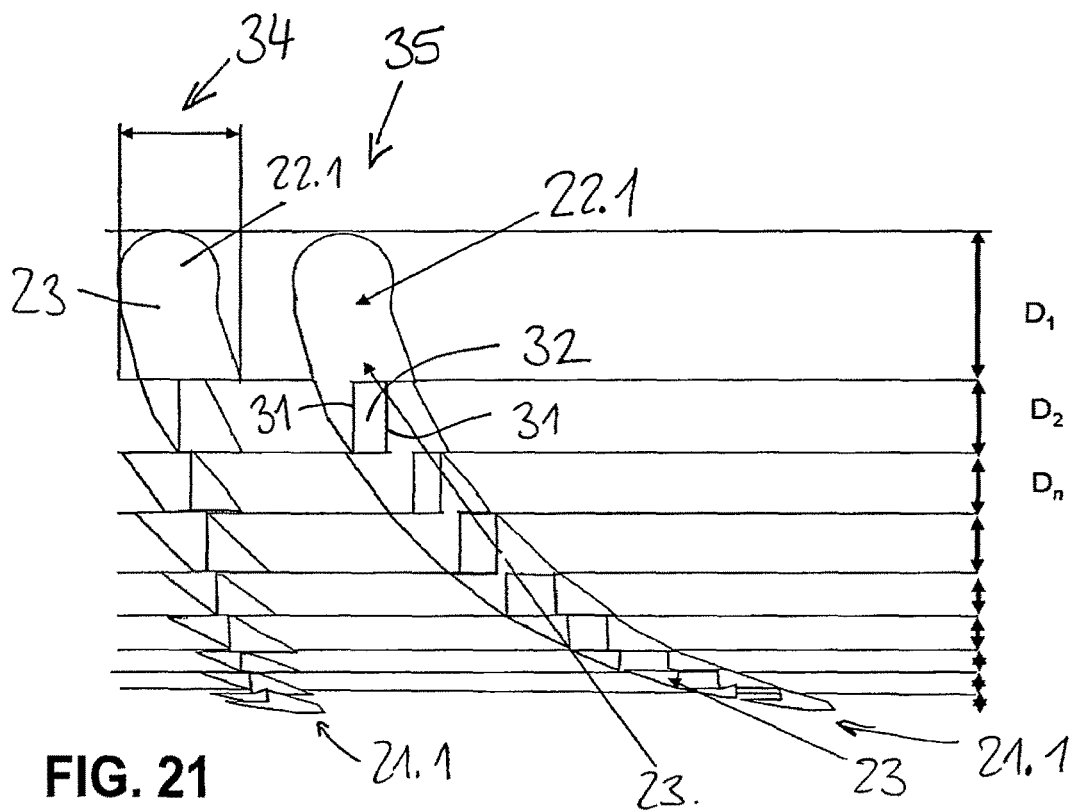
FIG. 21 is a schematic comparison of a vane in the "total air" mode position and in the "diffuse" mode position.
Figure 22:
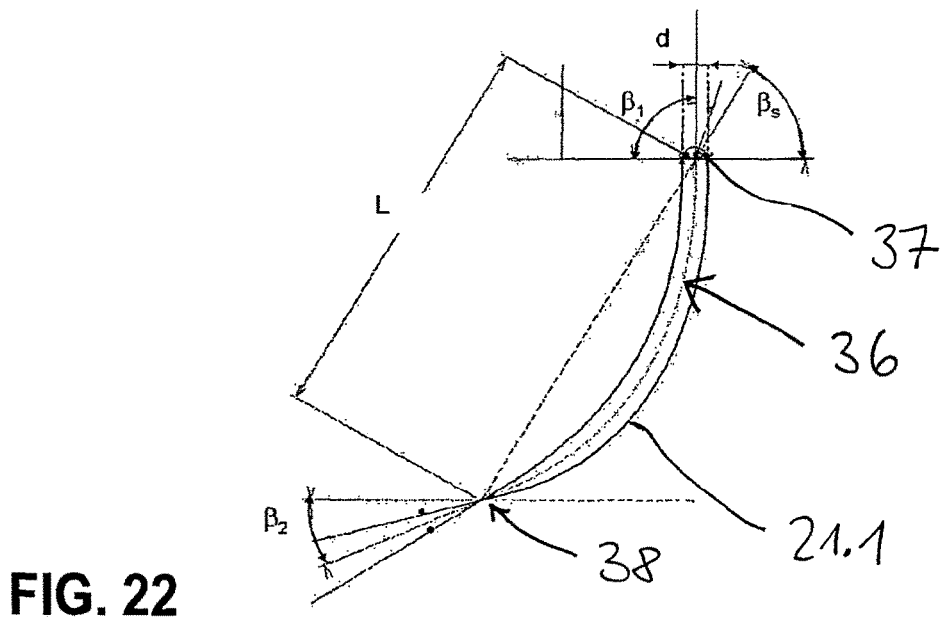
FIG. 22 shows a schematic diagram of a vane contour in cross section.

This displacement movement of the individual ribs 23 against one another is again shown in FIG. 21 for clarification. In FIG. 21 on the left side, the aligned position 34 of a vane 21.1 is shown (according to FIG. 20). In FIG. 21 on the right side, the position of vane 21.1 in the diffuse vane position 35 is shown (see FIG. 19). The outer shape of the resulting vane 21.1 in the diffuse vane position 35 is also readily evident in FIG. 21. A configuration of vane 21.1 in the form of a wing profile is possible in particular.

Figure 23:
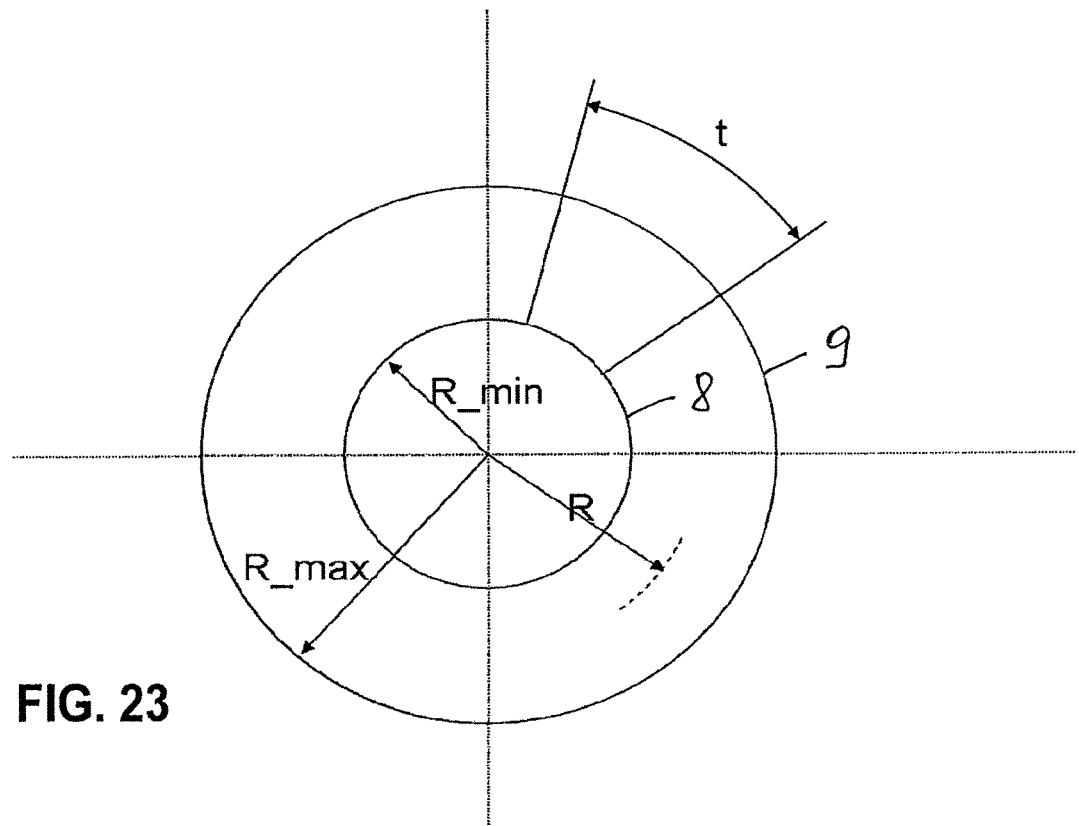
FIG. 23 shows a schematic illustration of the dimensioning of a ray ring in a plan view.

An approach is explained hereafter with whose aid it is possible to realize an advantageous embodiment of the individual vanes 6.1 to 6.n or 21.1 to 21.n of vane wheel 6, 21 of an air guide element 4, 19. The definition of the parameters used in this case is evident from FIG. 22 and FIG. 23.

First, the number of vanes N is established. N in this case can be selected between 1 and 20, preferably between 3 and 7, and can be especially preferably 5. Next the division t is determined. The division t is obtained from the circumference and the number of employed vanes. It follows that $t=2*\pi*R/N$, where R is the radius. The outer radius $R_{max}$ is preferably between 1 cm and 10 cm, especially preferably between 2.5 cm and 6 cm. $R_{min}$, in contrast, is preferably between 0 cm and 5 cm, especially preferably between 0.5 cm and 2 cm.

Next, the entrance angle $\beta_1$ and the exit angle $\beta_2$ are established; $\beta_1$ is preferably between 90° and 70°, especially preferably 90°. $\beta_2$, in contrast, is preferably between 10° and 70°, especially preferably between 20° and 40°.

The division ratio t:L is obtained as a function of the entrance and exit angle. The division ratio t:L is expediently between 0 and 2, preferably between 0.5 and 1.1, and especially preferably between 0.6 and 0.8. The vane length L can be calculated from this.

The optimal stagger angle $\beta_s$ is obtained as a function of the division ratio t:L and β2. The stagger angle $\beta_s$ is expediently between 0° and 90°, preferably between 40° and 80°, and especially preferably between 50° and 70°.

The vane thickness d in area 38 of the foremost segment 22.1 is within the range of 0 mm (i.e., the vane 21.1 tapers here), whereas the vane thickness d in area 37 of the rearmost segment 22.8 has its highest value $d_{max}$. $d_{max}$ is expediently between 0.1 mm and 20 mm, preferably between 1 mm and 10 mm, especially preferably between 2 mm and 5 mm.

The vane center line 36 follows a spline curve between the two nodes 37 and 38, whereby the two tangents to spline curve 36 in nodes 37, 38 are determined by the entrance angle $\beta_1$ or the exit angle $\beta_2$.

Figure 24:
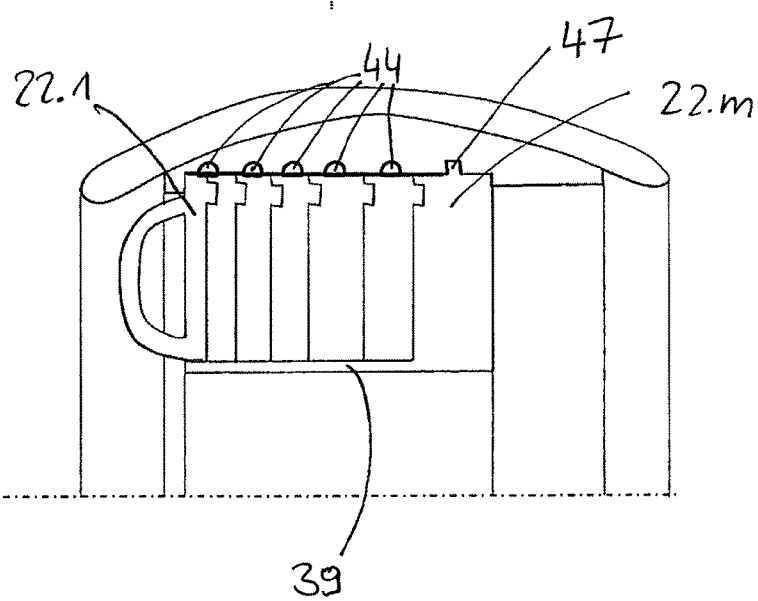
FIG. 24 shows schematically in a cross-section illustration an exemplary embodiment of a ray ring with an integrated bearing bushing.

FIGS. 24 and 25 show how one of the segments 22.1 to 22.m can be provided with a sleeve 39. In the present exemplary embodiment, sleeve 39 is formed in each case as a single piece with the associated segment 22.1 or 22.m. This can occur, for example, by a plastic injection molding process. In FIG. 24, sleeve 39 is formed integral with the rearmost segment 22.m (the rigidly attached segment). In contrast, sleeve 39 in the exemplary embodiment shown in FIG. 25 is formed integral with the foremost segment 22.1. Sleeve 39 functions as a supporting element for the rest of the segments 22.1 to 22.m. For example, an inner ring element 8 of the corresponding segment 22.1 to 22.m is placed on sleeve 39. The attachment of the rearmost segment 22.m in this case occurs via two detent lugs 47, which lie diagonally opposite on the perimeter and which engage in the corresponding recesses of the segment housing.

Further, catch members 44 are provided in FIGS. 24 and 25 on the radial outer end of segments 22.1 to 22.m−1. Catch members 44 cause an increased friction between segments 22.1 to 22.m−1 and the housing area formed adjacent thereto. The catch members can be fabricated, for example, from a foam material, which provides a certain friction between the outer peripheral edge of an outer ring element 9 of a segment 22.1 to 22.m−1 and catch member 44. It is pointed out that it is not necessary to provide a catch member 44 in the case of the rigidly disposed rearmost segment 22.m. Said segment is fixedly mounted in any event.

It is possible in addition to provide at least one corresponding detent lug 47 also in all segments 22.1 to 22.m−1, which are guided in a groove-shaped recess of the segment housing. The recesses have a greater extension in the circumferential direction than the detent lug, so that during rotation of the segments stops are formed in both directions. The driver function for the individual segments 22.2 to 22.m−1 is furthermore assumed by cut-outs 31 or hollow spaces 32. Because a partial function is therefore transmitted to the housing, the stress on the segments with respect to the strength is lower. If catch members 44 are supposed to be provided as described above, it is advantageous to arrange them on the perimeter offset to the recesses. In another variant, the detent lugs themselves could be formed as friction-increasing catch members.

Figure 27:
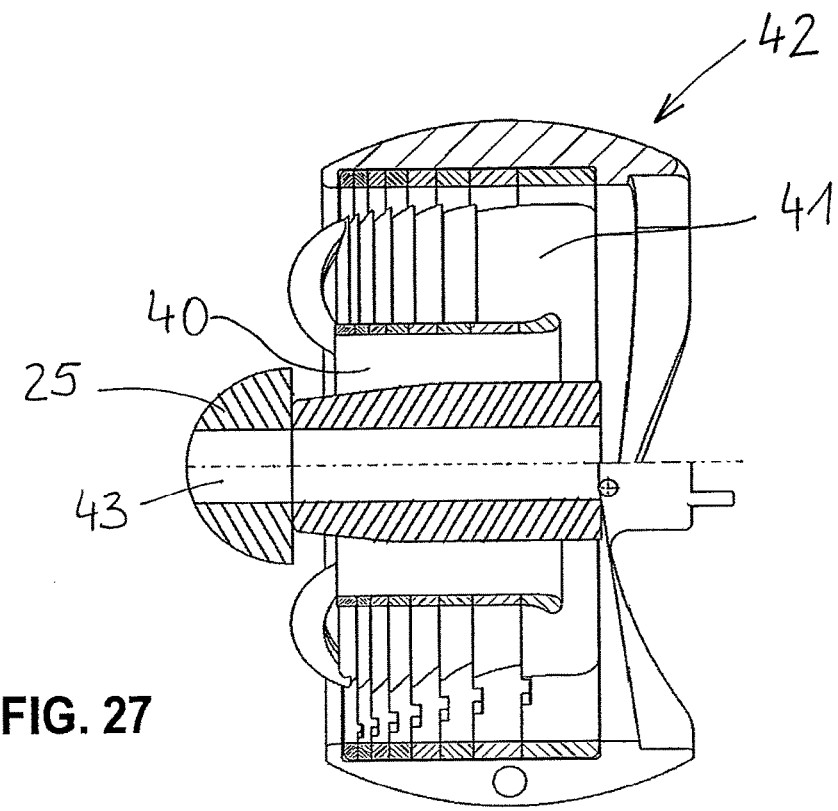
FIG. 27 shows another exemplary embodiment for an outlet with a ray ring and integrated additional spot air channel.

Different possible arrangements of spot air channel 40 and adjustable channel 41 are illustrated in FIGS. 26 and 27. In FIG. 26a, spot air channel 40 is formed as a central, circular air channel in the interior of air guide element 42. The adjustable air channel 42 surrounds spot air channel 40 like a ring. In FIG. 26b, spot air channel 40 is also disposed in the interior of an adjustable air channel 41 like a ring. An actuating handle 25 is provided in addition, however, in the center of spot air channel 40. As a result, therefore a ring-shaped form also results for spot air channel 40. It is illustrated in FIG. 26 that it is also quite possible to dispose the adjustable air channel 41 in the center of air guide element 42. Spot air channel 40 is therefore formed with a ring shape and surrounds the adjustable air channel 41 located within spot air channel 40. In analogy to FIG. 26*b*, in the exemplary embodiment of air guide element 42 shown in FIG. 26*c* as well, an actuating handle 25 is provided in the center of air guide element 42. It is naturally also conceivable to select a design in which actuating handle 25 is provided at a different location.

FIG. 27 illustrates based on a schematic cross section through an air guide element 42 that it is also possible to provide a central spot air channel 43 in the interior of an actuating handle 25. In the exemplary embodiment shown in FIG. 27, central spot air channel 43 is provided in addition to a spot air channel 41, which surrounds handle 25 like a ring. The adjustable air channel 41 in turn surrounds spot air channel 40 like a ring.

Figure 28:
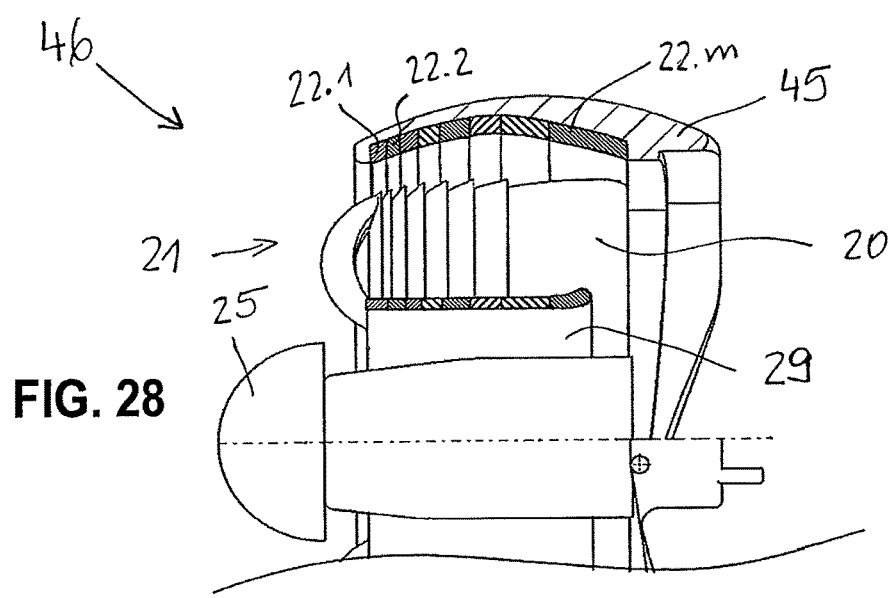
FIG. 28 shows schematically in a cross-section view another exemplary embodiment of a ray ring with a segment block fitted to a housing contour.

Finally, it is illustrated in FIG. 28 how the individual segments 22.1 to 22.*m* can be provided with a different outer radius, particularly with a different outer radius of the outer ring elements 9. Vane wheel 21 can be adapted with respect to its outer shape to the interior of a housing part 45 by the different radius. As a result, the available space can be used optimally. The air passage area of the outer air guide channel 20 can be enlarged at least in areas by the segments 22.1 to 22.*m* selected of variable size. As a result, however, the air resistance for the air passing through air guide element 46 can be reduced. As a result, in turn the pressure drop can be effectively reduced. As is also evident from FIG. 28, not only the outer radius of segments 22.1 to 22.*m*, but also the outer contour of segments 22.1 to 22.*m* can be adapted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air outlet for discharging an air stream in a vehicle interior, the air outlet comprising:
   a housing;
   at least one air guide channel within the housing;
   at least one air guide element disposed in the air guide channel, the air guide element configured as a vane wheel having at least one vane, wherein each vane is formed from at least two axially successively disposed segments that are movable angularly relative to one another between a position that brings about a diffuse mode and a position that brings about a total air mode with an axially variably adjustable flow cross section of the air guide channel, each of the axially successively disposed segments comprising:
      an inner ring;
      a recess formed in the inner ring; and
      a pin formed adjacent the recess, the pin configured to engage the recess of an adjacent one of the axially successively disposed segments;
   a segment housing surrounding the segments, the segment housing having a plurality of outwardly projecting guide ribs;
   guide beads disposed on an inside surface of the housing, the guide beads configured to receive the guide ribs; and
   an actuating element to move the segments relatively to one another,
   wherein the actuating element comprises an adjusting ring placed centrally on an axially last of the segments, said adjusting ring having a gripping structure disposed around an outer edge of the adjusting ring, the adjusting ring projecting outwardly from the housing, and a plurality of adjusting bars disposed within the adjusting ring, the gripping structure comprising a plurality of gripping surfaces positioned outside of the housing and configured to be gripped by a user for activating the actuating element.

2. The air outlet according to claim 1, further comprising at least one angular staggering positioning device, which in at least one part of the positions of the air guide element brings about a defined angular stagger of individual axially successively disposed segments.

3. The air outlet according to claim 2, wherein the individual axially successively disposed segments of at least one vane are disposed along a nonlinear curve, along an arcuately curved line, or along a spline line.

4. The air outlet according to claim 1, wherein an entrance angle of at least one vane is at least at times between 30° and 150°, between 70° and 110°, or between 85° and 95°, and/or the exit angle of the air stream is at least at times between 0° and 90°, between 10° and 70°, or between 20° and 40°.

5. The air outlet according to claim 1, wherein an average stagger angle, at least at times between two axially successively disposed segments, is between 0° and 90°, between 40° and 80°, or between 50° and 70°.

6. The air outlet according to claim 1, wherein at least two of the axially successively disposed segments have a different shape or wherein all of the axially successively disposed segments have a different shape.

7. The air outlet according to claim 1, wherein, in the diffuse mode, a substantially flush surface contouring of at least one vane results, which runs approximately parallel to a curve of the segments of a corresponding vane.

8. The air outlet according to claim 1, wherein at least two segments disposed axially adjacent in succession overlap at least in areas when viewed in an axial direction.

9. The air outlet according to claim 1, further comprising at least one additional air guide channel that is operated substantially steadily in a total air mode.

10. The air outlet according to claim 1, wherein at least one of the air guide channels is configured as a ring-shaped air guide channel and/or as a circular air guide channel.

11. The air outlet according to claim 1, wherein at least one segment has a sleeve-like extension, which functions as a bearing bushing for at least one part of the other segments.

12. The air outlet according to claim 1, further comprising at least one self-locking device for at least one segment, which is formed as a narrow fit, as frictional material, as an insertion device, and/or as a roughening.

13. The air outlet according to claim 1, further comprising at least one driver device, which imparts a movement between at least two of the axially successively disposed segments.

14. The air outlet according to claim 1, wherein the segments follow a predefined edge contouring, an air guide channel contouring, or a housing contouring.

15. The air outlet according to claim 1, wherein the at least two axially successively disposed segments comprise a disk element having the inner ring element, an outer ring element disposed concentrically around the inner ring element, and at least two ribs radially disposed between the inner ring element and the outer ring element.

16. The air outlet according to claim 15, further comprising a stop formed on the at least two ribs.

17. The air outlet according to claim 1, further comprising an elongate hollow cylinder disposed in said at least one air guide channel,
   wherein said inner ring of each of the axially successively disposed segments is disposed around the elongate hollow cylinder.

18. The air outlet according to claim 1, wherein said pin is smaller than said recess such that said pin is configured to move within said recess.

19. The air outlet according to claim 1, wherein each of the axially successively disposed segments is axially rotatable.

20. An air outlet, the air outlet comprising:
a housing;
an air guide channel within the housing;
an air guide element disposed in the air guide channel, the air guide element having a vane, wherein the vane is formed from at least two axially successively disposed segments, each of the successively disposed segments being movable angularly relative to one another, each of the axially successively disposed segments comprising:
   an inner ring;
   a recess formed in the inner ring; and
   a pin formed adjacent the recess, the pin configured to engage the recess of an adjacent one of the axially successively disposed segments;
a segment housing surrounding the segments, the segment housing having a plurality of outwardly projecting guide ribs; and
guide beads disposed on an inside surface of the housing, the guide beads configured to receive the guide ribs; and
an actuating element to move the segments relatively to one another,
wherein the actuating element comprises an adjusting ring placed centrally on an axially last of the segments, said adjusting ring having a gripping structure disposed around an outer edge of the adjusting ring, the adjusting ring projecting outwardly from the housing, and a plurality of adjusting bars disposed within the adjusting ring, the gripping structure comprising a plurality of gripping surfaces positioned outside of the housing and configured to be gripped by a user for activating the actuating element.

21. An air outlet, the air outlet comprising:
a housing, said housing comprising a guide portion disposed on an inner surface of said housing;
an air guide channel disposed within said housing; and
an air guide element disposed in said air guide channel, said air guide element comprising:
   a segment housing, said segment housing comprising at least two outwardly projecting ribs disposed on an outer surface of said segment housing, said at least two outwardly projecting ribs being configured to be received within said guide portion;
   at least two axially successively disposed segments mounted within said segment housing concentrically around a longitudinal axis of the air outlet, said at least two segments comprising a disk element having an inner ring element, an outer ring element disposed concentrically around the inner ring element, at least two ribs radially disposed between the inner ring element and the outer ring element, each of the successively disposed segments being movable angularly relative to one another, a recess formed in the inner ring and a pin formed adjacent the recess, the pin configured to engage the recess of an adjacent one of the axially successively disposed segments; and
an actuating element to move the segments relatively to one another,
wherein the actuating element comprises an adjusting ring placed centrally on an axially last of the segments, said adjusting ring having a gripping structure disposed around an outer edge of the adjusting ring, the adjusting ring projecting outwardly from the housing, and a plurality of adjusting bars disposed within the adjusting ring, the gripping structure comprising a plurality of gripping surfaces positioned outside of the housing and configured to be gripped by a user for activating the actuating element.

22. An air outlet, the air outlet comprising:
a housing, said housing comprising a guide portion disposed on an inner surface of said housing;
an air guide channel disposed within said housing; and
a spherical air guide element rotatably mounted within said air guide channel, said air guide element comprising:
   a segment housing, said segment housing comprising at least two outwardly projecting ribs disposed on an outer surface of said segment housing, said at least two outwardly projecting ribs being configured to be received within said guide portion; and
   an outer disk-shaped segment and at least one successively disposed inner disk-shaped segment mounted within said segment housing concentrically around a longitudinal axis of the air outlet, said outer disk-shaped segment and said at least one successively disposed inner disk-shaped segment comprising:
      an inner ring element;
      an outer ring element disposed concentrically around the inner ring element;
      at least two ribs radially disposed between the inner ring element and the outer ring element; and
      a recess formed in the inner ring,
   wherein least one successively disposed inner disk-shaped segment further includes a pin formed adjacent the recess, the pin configured to engage the recess of an adjacent segment, and
   wherein said outer disk-shaped segment and said at least one successively disposed inner disk-shaped segment are movable angularly relative to one another.

* * * * *